United States Patent [19]
Dutta

[11] Patent Number: 6,130,887
[45] Date of Patent: Oct. 10, 2000

[54] METHODS OF DYNAMICALLY SWITCHING RETURN CHANNEL TRANSMISSIONS OF TIME-DIVISION MULTIPLE-ACCESS (TDMA) COMMUNICATION SYSTEMS BETWEEN SIGNALLING BURST TRANSMISSIONS AND MESSAGE TRANSMISSIONS

[75] Inventor: Santanu Dutta, Cedar Rapids, Iowa

[73] Assignee: AMSC Subsidairy Corporation, Reston, Va.

[21] Appl. No.: 09/233,068

[22] Filed: Jan. 20, 1999

Related U.S. Application Data

[62] Division of application No. 08/724,116, Sep. 30, 1996, Pat. No. 5,923,648.

[51] Int. Cl.[7] ............................. H04B 7/212; H03D 3/02
[52] U.S. Cl. ..................... 370/347; 370/347; 370/522; 329/304
[58] Field of Search .................................. 370/349, 389, 370/522; 329/304, 347, 312

[56] References Cited

U.S. PATENT DOCUMENTS

| | | | |
|---|---|---|---|
| 4,189,677 | 2/1980 | Cooper et al. | 375/316 |
| 4,905,221 | 2/1990 | Ichiyoshi | 370/320 |
| 4,932,070 | 6/1990 | Waters et al. | 455/10 |
| 5,121,387 | 6/1992 | Gerhardt et al. | 370/322 |
| 5,229,995 | 7/1993 | Strawczynski et al. | 370/280 |
| 5,272,446 | 12/1993 | Chalmers et al. | 329/304 |
| 5,303,234 | 4/1994 | Kou | 370/442 |
| 5,420,863 | 5/1995 | Taketsugu et al. | 370/337 |
| 5,542,093 | 7/1996 | Bodin et al. | 370/337 |
| 5,590,133 | 12/1996 | Billstrom et al. | 370/349 |

*Primary Examiner*—Hassan Kizou
*Assistant Examiner*—Saba Tsegaye
*Attorney, Agent, or Firm*—Irah H. Donner; Pepper Hamilton LLP

[57] ABSTRACT

In a communication system for communicating on at least one channel group, a demodulator is disclosed. The channel group has at least one forward channel and at least one return channel, where a central station transmits data over the forward channel to a plurality of terminals at a forward data rate, and transmissions by each terminal to the central station are performed on any one of the return channels at a return data rate. The demodulator comprises a burst demodulator that demodulates received, discrete signaling packets of information over the return channels. The demodulator also comprises a message demodulator that is responsively connected to the burst demodulator, such that when the message demodulator is activated, the burst demodulator becomes deactivated when the return channel operates in a messaging mode. Thus, a feature of the demodulator is that it is a dual function demodulator that functions either as a burst demodulator, or as a continuous or message demodulator. Switching to one or the other operational modes is controlled by a network management subsystem.

13 Claims, 7 Drawing Sheets

FRAME TYPE A

FRAME TYPE B

FRAME TYPE C

600 BPS

1200 BPS

2400 BPS

4800 BPS

METHODS OF DYNAMICALLY SWITCHING RETURN CHANNEL TRANSMISSIONS OF TIME-DIVISION MULTIPLE-ACCESS (TDMA) COMMUNICATION SYSTEMS BETWEEN SIGNALLING BURST TRANSMISSIONS AND MESSAGE TRANSMISSIONS

CROSS REFERENCE TO RELATED APPLICATIONS

This application is a divisional application of U.S. Application Ser. No. 08/724,116 filed Sep. 30, 1996 now U.S. Pat. No. 5,923,648, which is incorporated herein by reference.

This application is related in its disclosure to the subject matter disclosed in the following applications, all by S. Dutta, all assigned to the assignee of this application, and filed on even date herewith:

Application Ser. No. 08/724,115, filed Sep. 30, 1996, entitled "Methods of Load Balancing and Controlling Congestion in a Combined Frequency Division and Time Division Multiple Access Communication System Using Intelligent Login Procedures and Mobile Terminal Move Commands" now U.S. Pat. No. 5,898,681; and Application Ser. No. 08/724,120, filed Sep. 30, 1996, entitled "Methods of Communicating over Time-Division Multiple-Access (TDMA) Communication Systems with Distinct Non-Time-Critical and Time-Critical Network Management Information Transmission Rates", now pending.

BACKGROUND OF THE INVENTION

This invention relates to message store-and-forward communication systems and particularly to radio-frequency store-and-forward communication systems which operate typically over a predetermined, limited number of available communication channels. Features of the invention are found to have particular application in satellite communication systems operating in a "star topology" over a fixed number of channels.

The invention herein is described as an improvement over a well known prior art system which is known as the "Standard-C communication system", see THE STANDARD C COMMUNICATION SYSTEM, N. Teller et al. International Maritime Satellite Organisation, London, England, International Conference on Satellite Systems for Mobile Communications and Navigation, 4th, London, England, Oct. 17–19, 1988, Proceedings (A89-36576 15–32). London, Institution of Electrical Engineers, pp. 43–46, (1988). A communication system such as the Standard-C system operates in a "star topology", hence between a "hub" and a substantial number of "mobile terminals". The Standard-C system utilizes schemes known as Time-Division Multiple-Access (TDMA) and Frequency-Division Multipl-Access (FDMA) to accommodate a large number of internittent users (intermittently used mobile terminals) to share a limited-bandwidth, allocated, radio frequency band.

In FDMA, the allocated band is divided into a first number of narrow sub-bands, each sub-band constituting a time-continuous channel. The first number of channels are to be shared among a second number of users, where the second number, the number of users, is typically much larger than the first number of channels. An access protocol referred to as trunking is used to accommodate the relatively larger number of users.

In TDMA, an entire allocated band forms a wideband communication channel which is allocated to different users at different times. Data packets from a given user may be interspersed with those of another user during transmission over the communication channel.

Known communication systems, including the above-identified Standard-C Communication System, use a combination of FDMA and TDMA, where time-division multiplexing is used in the frequency-division multiplexed sub-bands. In the Standard-C system, forward (from the hub to the mobile terminals) data traffic is carried in a time-division multiplexed (TDM) forward channel which is received by all mobile terminals of the system. Other, combined frequency/time-division multiplexed channels carry return data traffic from the mobile terminals to the hub.

Both the forward data traffic and return data traffic consist of two traffic components of data. A first traffic component of data necessary for "call-setup" and "call-teardown" includ es data referred to broadly as system data and more specifically as network management data. The first traffic component of data is called "signalling" or signalling packets (of data). The term "signalling" is used herein throughout to refer to this first traffic component of data and to a specific transmission mode in communication from the mobile terminals to the hub. A second traffic component of data bears user information, such as messages or data reports. Messages are typically user information, having been composed by the user, while data reports are typically telemetry-type information packets that are transmitted periodically by the mobile terminals. The transmissions of the second traffic component of data to transfer user messages is also referred to herein as "messaging". User information is in the forward direction communicated over typically fixed links to the hub. The hub stores the user information and selectively formats it as the second traffic component of data into the frames for transmission over the TDM forward channel. Systems, such as the Standard-C system are therefore also referred to as "store-and-forward" communication systems.

The Standard-C system communicates at a fixed data rate of 600 bits per second (bps). In communication over the TDM, or forward channel, data of both components are formatted into frames and are transmitted as a sequence of consecutive frames over the TDM channel. The frame length is established at 8.64 seconds, such that during a 24-hour period an integer number of 10,000 frames are transmitted over the TDM channel. The information, message and signalling packets, are scrambled, ½-rate convolutionally encoded, and interleaved on a frame by frame basis. Decoding of received frames of information is also done on a frame by frame basis. Considering that the transfer of messages or "messaging" also requires "signalling" in both the forward and the return direction, decoding delays become additive and result in typical message transport delays of several minutes, such that a command-response type of transaction cycle may take place over a time period of about five minutes.

Past applications of the Standard-C system in global communications have traditionally involved communications between a fixed shore station (the hub) and any one of a number of mobile terminals which were ship-based. In such maritime environment, message transport delays of several minutes were not considered to be unacceptable.

In contrast to a relative indifference to time delays in shore to ship communications, user messages between a central trucking dispatch depot and a fleet of operating trucks tend to be more time-sensitive. For example, interactive communication is required when a driver is in difficulty, e.g. by being lost or in misunderstanding with a customer. Urgent messages to alert drivers of additions or deletions in pick-up or delivery schedules while the trucks are already enroute are more the rule than the exception. Thus, if a Standard-C communication system operates between a "land earth station" ("LES") as a hub and a number of mobile terminal equipped, land-based vehicles, existing message transport delays of several minutes for typical command-response type transactions become undesirable.

Increasing the data transmission rate over the standard 600 bps data rate of the Standard-C system would result in a higher message data capacity per frame, thus allowing more mobile terminals to be serviced over the system. However a data rate increase over that of the prior art 600 bps would not alleviate the system's inherent message transport delays. On the other hand, relatively shorter frame lengths could speed up handshake operations between transmitting and receiving terminals and would therefore reduce message transport delays. However, the use of frame lengths shorter than the standard 8.64 second frame length would, at any given transmission rate, tend to increase the ratio of network management data to user message data. Thus, shortening the frame length by simply increasing the data rate proportionally to the frame length reduction does not improve the aforementioned overhead ratio of network management information to user information. The frame structure comprising both network management data and user message data would become compressed in time but remain proportionally the same.

Besides the undesirably long message transport delays which are experienced in the described prior art communication systems, a problem of channel usage is experienced in such prior art systems. Communication systems, such as the Standard-C system, dedicates frequency-division multiplexed return channels as either signalling channels or message channel. Thus, when the mobile terminals communicate with the hub, the first traffic component over the return channels, namely signalling, is assigned to the dedicated signalling return channels. Conversely, the second traffic component of user messages is assigned to the dedicated messaging return channels. It has become apparent that such use dedication of available channels for communication from the mobile terminals to the hub results in an uneven utilization of the available channel capacities. As described above, signalling as used herein refers to the transport of protocol data packets for the purpose of network management, e.g. for call establishment and tear-down. Time division multiplexing within a signalling channel is accomplished by means of the slotted Aloha protocol, a contention-based channel access algorithm that does not guarantee packet delivery. In addition to the transport of network management protocol packets, it is also common to use the signalling channel for the transport of short data reports, provided they can tolerate non-guaranteed delivery, the use of signalling channel for such purpose being referred to as "datagram" service. In contrast, user messages requiring guaranteed delivery are sent on separate frequency multiplexed time-division multiple-access (TDMA) channels which are contention free. It is these latter type of TDMA channels that are referred to as "message channels". Access to the message channels is controlled by the hub, and is orchestrated through instructions contained in protocol packets which are sent on the forward TDM channel and acknowledged or responded to over the return signalling channel. When typical user message communication takes place over the Standard-C system, it is common to reach a traffic congestion limit in the TDM forward channel and the signalling channels before reaching a congestion limit in the message channels. Therefore, the message channels often remain still underutilized when the signalling capacity of a particular channel group has become exhausted and further traffic has to be routed to a new channel group.

SUMMARY OF THE INVENTION

It is therefore an object of the invention to optimize return channel capacity in leased channel groups.

Yet another object of the invention is to adapt the capacity of a fixed number of leased transmission channels to handle a range of ratios of signalling to messaging activities over return channels to more fully utilize the transmission channels before switching to new channel groups.

The invention is an improved time division multiple access (TDMA) communication system which operates to transmit data from a central station to a plurality of terminals over a forward channel of a channel group. Pursuant to the operation of the system, the data are formatted into frames of a predetermined length or frame time period. The frame time periods are used, in turn, as timing periods for time-multiplexed transmissions by the terminals to the central station on return channels of the channel group. According to the improvement, periods of a length of at least one frame time period are selectively allocated on any of the return channels of the channel group to the transmission of message data from any designated one of the terminals in a continuous stream of message data for the duration of any of the selectively allocated periods. Periods other than the periods selectively allocated to message transmission on any of the return channels are allocated to signalling transmissions to occur within discretely defined signalling slots occurring within consecutive frame time periods.

Specific examples of preferred, preestablished frame time periods or frame lengths, without limiting the scope of the invention, are a frame length of 1.0 second for data rates of 600 or 1200 bits per second (bps), a frame length of 0.5 second for a data rate of 2400 bps, and a frame length of 0.25 second for a data rate of 4800 bps.

The formatted frames of data include time-critical network management data, such as return channel frequency assignments and slot timing for both signalling and messaging modes of return channel communication. The time-critical network management data are consigned to a return channel descriptor packet of each frame.

In a method of transmitting data over the forward channel in accordance herewith, time-critical network management data are transmitted periodically at a first rate, a frame transmission rate, to establish, for incremental periods of the length of a frame time period whether a respectively timed period is selectively allocated to the transmission of message data in a messaging mode. Non-time-critical network management data are data that are not determinative of the transmission mode of any such designated return channel during the respective period as being the signalling mode or the messaging mode, and that may be transmitted periodically at a second rate which is less than the frame transmission rate.

Other features and advantages will become apparent from the detailed description set forth below.

BRIEF DESCRIPTION OF THE DRAWING

The detailed description of a preferred embodiment of the invention showing various distinctions over prior art Standard-C communication systems may be best understood when the detailed description is read in reference to the appended drawing in which.

DETAILED DESCRIPTION OF THE PREFERRED EMBODIMENT OF THE INVENTION

Figure 1:
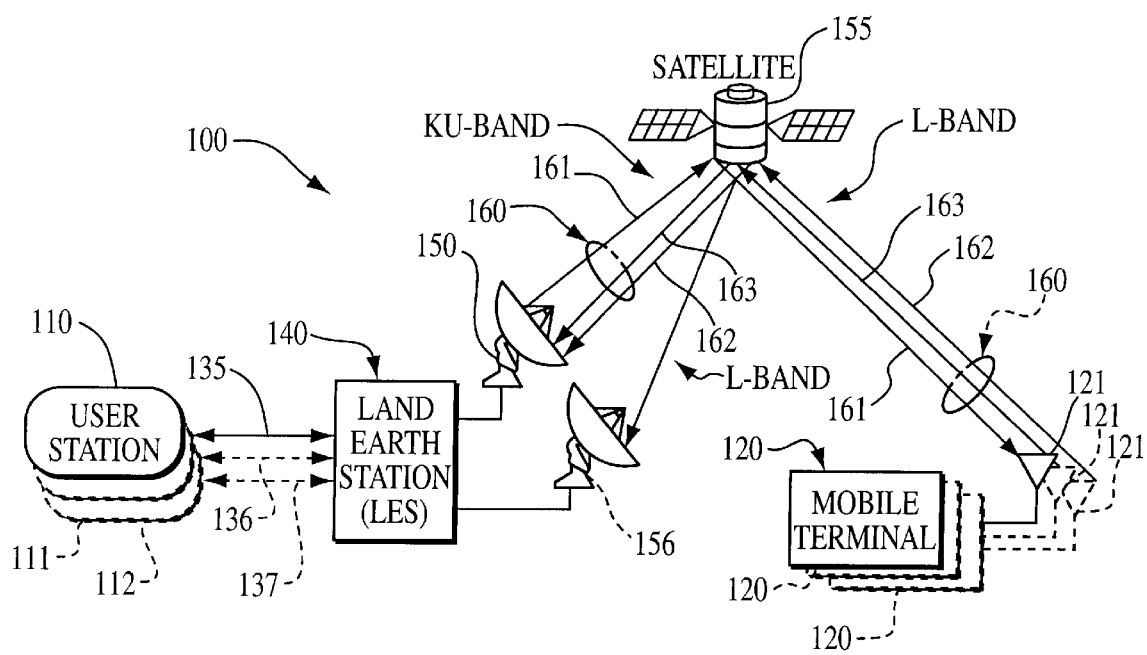
FIG. 1 is a simplified schematic representation of a communication system, showing in particular a satellite relayed time division multiple access message communication system which includes features of the present invention.

Referring to FIG. 1, the invention is described with respect to a satelliterelay communication system which is designated generally by the numeral 100. The communication system 100 provides, as the preferred embodiment of the invention, bidirectional, star topology data communication having at one end of the communications link an exemplary user station 110. The user station 110 is assumed to be stationary or "fixed", such as a truck dispatch center 110 or fixed user station 110. However, the stationary character of the fixed user station 110 is not critical to the invention. There may be one or more fixed user stations which become coupled to the communication system 100, as indicated by alternate fixed user stations 111 and 112, for example. The exemplary fixed user station 110 communicates to a plurality of associated terminals 120, which may be structurally identical, as indicated by their numerical designation, though the scope of the invention would not preclude the use of a number of structurally dissimilar mobile terminals. Also, when a plurality of fixed user stations 110, 111, 112, etc., are incorporated in the communication system 100, each one of the separate fixed user stations would, in a general scenario, seek to communicate with its own group or plurality of terminals 120. For example, the fixed user station 110 is described as communicating with a first set of the terminals 120, which are in the preferred embodiment mobile terminals 120, while the fixed user station 111 communicates with a second set of the mobile terminals 120. As an example, the fixed user station 110 may be envisioned to be a truck dispatch center 110, and each of a plurality of mobile terminals 120 may be a truck-mounted mobile terminal 120, each associated with a truck, the routing of which is controlled by the dispatch center 110.

User message communications via the communication system 100 is contemplated to be bidirectional, such that any of the mobile terminals 120 may originate communications with the corresponding fixed user station 110, just as the fixed user station 110 may communicate with any of the mobile terminals 120. Communication typically takes place via conventional communication facilities which are referred to herein generically as "fixed links". A fixed link 135, consequently, connects the fixed user station to a central station, such as a land earth station (LES) 140 of the communication system 100. Similarly, additional fixed user stations 111 and 112, etc., would be connected to the LES 140 via their own respective fixed links 136, 137. The fixed links 135, 136 and 137 of the preferred embodiment are contemplated to be either private, terrestrial, lcased lines from a long-distance telecommunication service provider, a terrestrial public packet data network, or a VSAT fixed satellite network.

The LES 140 communicates with the mobile terminals 120 via a satellite dish antenna 150 and a relaying satellite repeater 155, transmitting and receiving return transmissions over a plurality of distinct frequency multiplexed RF communication channels referred to collectively as a channel group 160. Transmit frequencies and bandwidths of each of the channels are assigned and controlled in the United States by the Federal Communications Commission (FCC). Transmissions between the LES and the satellite 155 take place on frequencies assigned in the Ku frequency band, while transmissions between the mobile terminals 120 take place on frequencies assigned in the L frequency band.

FIG. 1 further depicts a secondary receiving antenna 156 which receives L-band transmissions for closed loop control of uplink transmit power, automatic frequency control and time synchronization for signal demodulation at the LES 140. For example, the closed loop feedback signal received via the secondary antenna 156 conveniently provides a signal propagation delay correction which is necessary for burst demodulation at the LES 140.

As in prior art Standard-C communication systems, each channel group includes a single TDM channel or forward channel 161. In the communication system 100, pursuant to the invention, reliable data service with automatic repeat requests (ARQ) is provided over both of an illustratively representative number of two (2) return channels 162 and 163. It is to be noted, however, that the communication system 100 may operate with only a single return channel, such as return channel 162, in contrast to prior art systems.

In contrast to the communication system 100, prior art Standard-C communication systems operate with designated signalling and messaging return channels. A prior art signalling return channel may provide what is referred to as "from-mobile datagram service" used for "unreliable" data reporting, hence, without guaranteed delivery. In essence, there is no confirmation by the LES 140 of a receipt of the data report. Reliable "from-mobile" data service, providing guaranteed delivery, could, on the other hand, only be provided over designated messaging return channels. A typical Standard-C communication system might designate a plurality of two signalling return channels, and two or three messaging return channels, depending on an expected user message volume from mobile terminals. In such example, a prior art channel group might consist of six channels, one forward channel and five return channels with specifically assigned signalling or messaging functions.

Referring back to the preferred embodiment in contrast to such prior art Standard-C system, the return channels 162 and 163 of the present system 100 do not have predesignated functions of either a signalling or a messaging channel. Instead, messages carried over each of the return channels 162, 163, according to the invention, are slotted in a mixed sequence of signalling and messaging transmissions. Thus, a single TDM or forward channel 161 operating with a single return channel 162, for example, is sufficient to represent a basic, bidirectional channel group 160 of a communication system 100, providing signalling functions and reliable data service with ARQ over such single return channel 162. Channel groups 160 can, consequently, be configured to include the one forward channel 161 and an optimally selected number of generic return channels 162, 163, or more, based on message traffic projections over a return channel link. Thus, for the channel group 160, the two generic return channels 162, 163 are representative of any number of return channels. An upper limit to the need for adding more return channels (in addition to the return channels 162, 163) to a channel group is reached when the capacity of the TDM or forward channel 161 of the particular channel group 160 becomes exhausted. A properly selected number of return channels in the channel group 160 will show a substantially equal utilization of all channels of the channel group 160.

Figure 2:
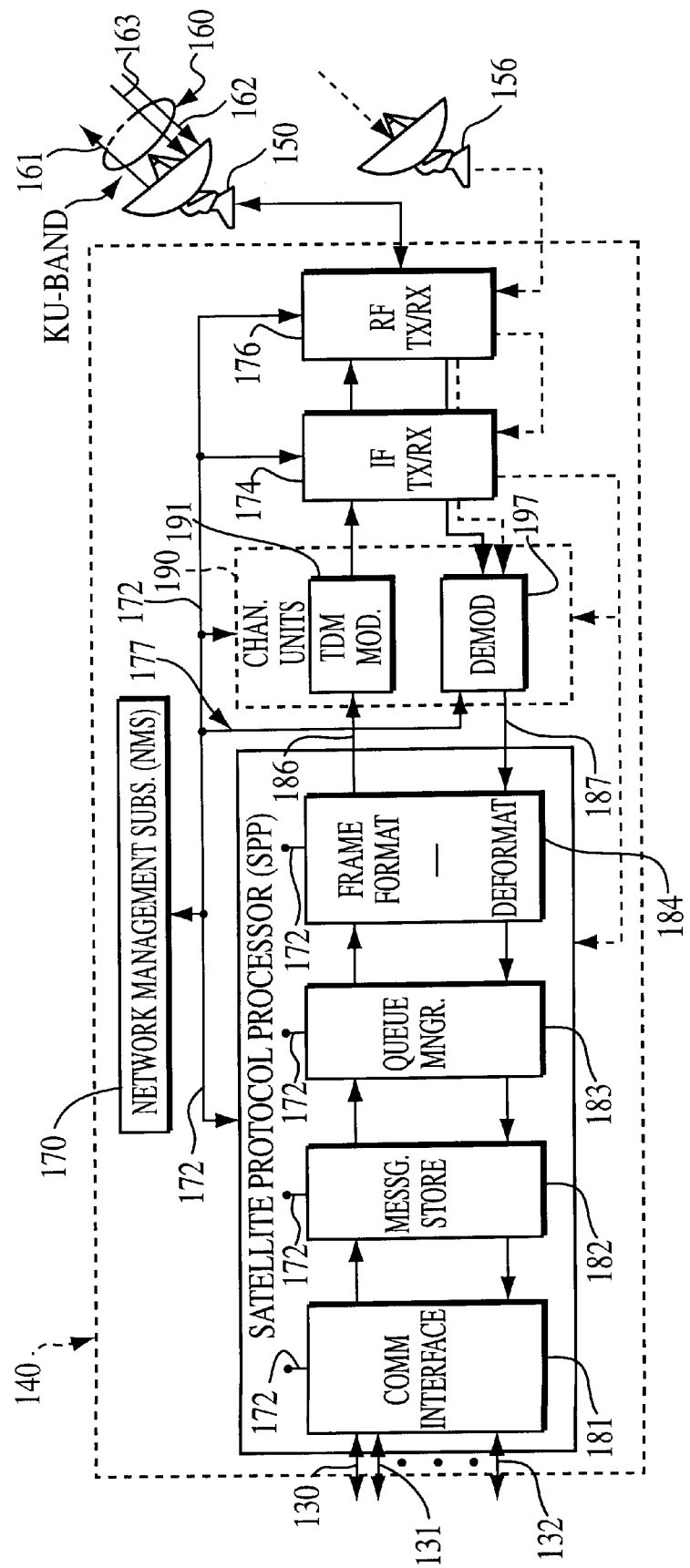
FIG. 2 is a simplified schematic representation of a Land Earth Station of the communication system showing a satellite protocol processor (SPP) and channel units (CU) in greater detail and in conjunction with a network management subsystem (NMS)

FIG. 2 is a simplified schematic representation of elements which execute functions of the land earth station (LES) 140 of the communication system 100. A network management subsystem (NMS) 170 is coupled via a control bus 172 to all functional apparatus groups of the LES 140 including an intermediate frequency (IF) transmit-receive subsystem 174 and a radio frequency (RF) transmit-receive subsystem 176. Interaction with the IF and RF subsystems 174 and 176 oversees for example system timing, uplink power and automatic frequency control operations. The control by the network management system further includes control over a return channel demodulator selection function shown as switch control 177 in FIGS. 2 and 4.

In reference to FIG. 2, the control bus 172 further couples the network management subsystem 170 to the satellite protocol processor, the operations of which include virtually all digital data processing prior to modulation in the forward channel direction and subsequent to demodulation in the reverse channel direction of information flow. The operations include assembling outgoing network management information and received user messages in formatted blocks or frames of digital information. User messages are received over fixed links 135, 136, 137 from a respective fixed user station 110 (shown in FIG. 1). As shown in FIG. 2, any number of the fixed links, as are designated generally by the fixed links 135, 136 and 137, terminate at a communication interface 181 of the SPP 180. Operations of the communication interface 181 are coupled to and are monitored and controlled by the network management subsystem 170 via the control bus 172, a termination of which is shown as being functionally coupled to the communication interface 181. The communication interface 181 interfaces outwardly with the fixed user station 110 as described. The communication interface 181 may also communicate system busy signals or other network problem reports to the fixed user station 110. The communication interface is coupled for bidirectional data transfer to a message storage subsystem 182 which temporarily stores user messages. These stored user messages would either have been received by the LES 140 from one of the mobile terminals 120 as referred to in the above description of FIG. 1, or the user messages have been transferred into storage by the communication interface 181.

Referring to further details of the SPP 180 in FIG. 2, the message storage subsystem 182 is connected bidirectionally, and is thereby communicatively coupled to a queue manager subsystem 183, which in turn is coupled to a frame formatter and deformatter subsystem 184, whereby each of the communication links between the respective functional units 182, 183 and 184 are bidirectional to process messages being sent to, and coming from, the fixed links 135, 136 and 137. Each of the subsystems 182, 183 and 184 are monitored and controlled by the network management subsystem 170 as schematically shown by respective terminations of the control bus 172.

The queue manager subsystem 183 retrieves user messages from the storage subsystem 182 to most efficiently fill frames of data to be transmitted via the TDM or forward channel 161, and stores in the storage subsystem 182 decoded and properly addressed messages received by the LES 140 over one of the return channels 162 or 163. These latter stored messages are periodically transferred by the communication interface 181 to a respective one of the fixed user stations 110, 111 or 112, based on addresses associated with such messages. Optionally, the messages may be forwarded immediately to the respective fixed user station rather than being stored for periodic retrieval.

The frame formatter and deformatter subsystem 184 assembles in the direction of the forward channel the frames of information to be transmitted over the TDM or forward channel 161. The assembled information is provided by the subsystem 184 to a digital link 186. The assembled information includes predetermined network management information and any user messages which can be accommodated in available data byte positions in each such frame. In a return direction flow of information, the frame formatter and deformatter subsystem 184 extracts successful burst demodulation information over a digital link 187 and converts the user information into a format suitable for transfer to a respective one of the fixed user stations.

The digital links 186 and 187 functionally couple the frame formatter and deformatter subsystem 184 to a channel unit subsystem 190. The channel unit subsystem 190 provides a function of digital modulation in the forward direction of data flow between the satellite protocol processor 180 and the analog IF and RF subsystems 174 and 176, and a digital demodulation function in the return direction of data flow between respective analog RF and IF subsystems 176 and 174, and the digital SPP subsystem 180.

In the forward direction of data flow, a TDM modulator 191 receives assembled frames of information over the digital link 186, modulates the frames of information, converts the modulated information to an analog signal and transfers the data modulated analog signal to the IF subsystem 174, as shown in FIG. 2.

Figure 3:
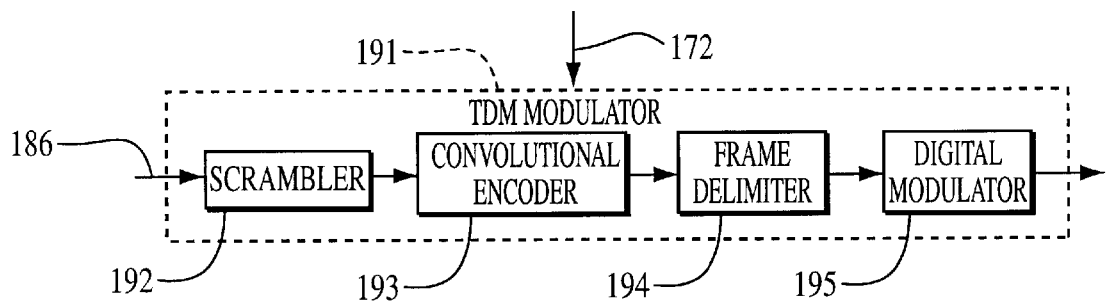
FIG. 3 is a more detailed functional diagram of a TDM or forward channel modulator of the channel units represented in FIG. 2.

FIG. 3 shows functions of the TDM modulator which are in general those of prior art Standard-C systems, differing in specifics and preferred operations as noted. The known functions include scrambling of data in a scrambler 192. Scrambling enhances 0/1 transitions and is known to thereby enhance recognition or reception of transmitted signals. The scrambled signal is convolutionally encoded for forward error correction by a convolutional encoder 193. The encoder uses known coding methods, such as rate-½ convolutional code with prior art generator polynomials but applies such code in the preferred embodiment described herein to data transmitted at data rates of 2400 and 1200 as well as to those transmitted at a standard 600 bit per second data rate which is also used in the Standard-C communication system. At a data rate of 4800 bps a punctured version of the rate-½ code is used to generate an effective code rate of ¾. A frame delimiter 194 adds a unique word to the encoded data as a frame start sequence. The now fully assembled frame is passed to a digital modulator 195. Forward link modulation is preferably p/4 gray-coded DQPSK with root raised cosine filtering to limit the bandwidth of the signal. The output of the digital modulator 195 is an analog signal which is applied to the IF transmit-receive subsystem 174, as shown in FIG. 2.

Figure 4:
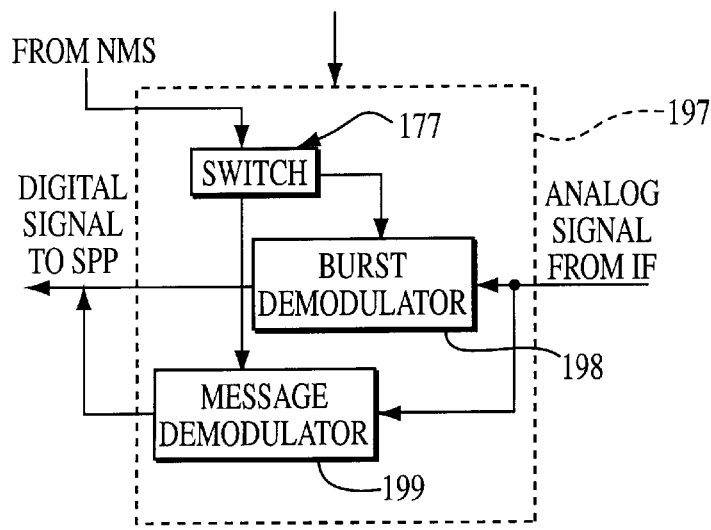
FIG. 4 is a more detailed functional diagram of a representative one of the return channel demodulators for demodulating return channel signals received by the land earth station, as schematically represented in FIG. 2.

FIG. 4 shows a more detailed schematic representation of a demodulator which is designated generally by the numeral 197. A feature of the demodulator 197 is that it is a dual function demodulator which functions either as a burst demodulator of received, discrete signalling packets of information, or it functions as a continuous or message demodulator. Switching to one or the other operational modes is controlled by the network management subsystem 170. The the demodulator 197 may, however, include as a first separate functional element a burst demodulator 198 which has the sole function of demodulating received, discrete signalling packets of information. A second separate functional element, a continuous or message demodulator 199 is activated, and the burst demodulator 198 becomes deactivated when the return channel, such as return channel 162 (FIG. 1) operates in a messaging mode. Control over activation of one or the other function is exercised by the network management subsystem 170 in the particular embodiment via the switch function 177. The switch function may be the operation of a hardware switch 177, or it may be a typical device select signal applied by the NMS 170. The switch 177 is representative of both. In both instances, the NMS controls via the switch 177 an operation of either the burst demodulator 198 or the message demodulator 199. Also, as a further modification, the demodulator 197, instead of having integral therewith a burst demodulator 198 and a message demodulator 199, may feature the burst demodulator 198 as a physically separate unit from the message demodulator 199. Again, either one or the other of the distinct demodulator units 198 or 199 would be activated by a switching operation over the switch 177 to demodulate either a burst of data representing a short signalling information packet, or to demodulate a message mode transmission, which is typically longer than a signalling information packet, as received from one of the mobile terminals 120 shown in FIG. 1.

Figure 5:
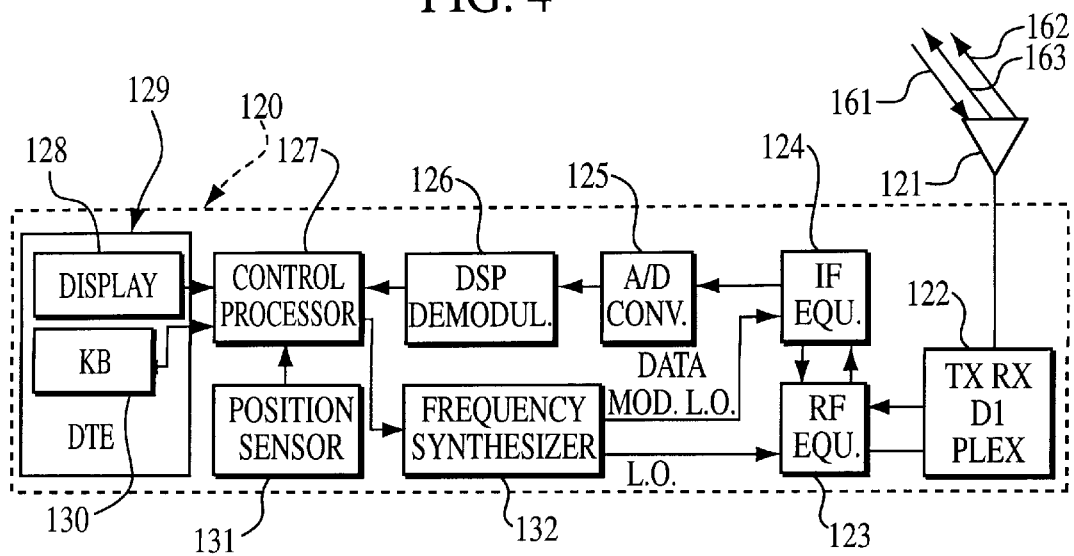
FIG. 5 is a schematic diagram of major functional blocks of a representative one of the mobile terminals in FIG. 1, showing particular features pursuant to the present invention.

FIG. 5 is a schematic representation of the mobile terminal 120, as shown in FIG. 1, but showing functional elements in greater detail. The mobile terminal 120 would differ from prior art mobile terminals operating with a prior art Standard-C communication system. In a prior art Standard-C system, received as well as transmitted data are all at the same data rate of 600 bits per second. In distinction over the prior art, the mobile terminal 120 has, in the preferred embodiment, the ability to identify the data rate of data received over a modulated RF signal on a preset forward channel. The mobile terminal 120 of the preferred embodiment has the further function of transmitting data at a rate that is automatically set by a network management message received over the forward channel from the LES 140 (See FIG. 1).

The mobile terminal 120 depicted in FIG. 5 shows a signal path for received transmissions over the TDM or forward channel 161 as received by an antenna 121 of the mobile terminal 120. The antenna 121 either transmits or receives signals, and as such is coupled to a transmit-receive diplexing unit 122. The diplexing unit 122 switches the antenna 121 between transmitting and receiving modes. Received signals are converted by an RF stage 123 and then by an IF stage 124. The IF stage 124 is coupled to an analog-to-digital (A/D) converter 125. A downconverted analog signal output from the IF stage 124 is consequently applied as an input to the A/D converter 125. A resulting digital signal output from the A/D converter 125 is applied as a signal input to a DSP demodulator 126. The DSP demodulator demodulates the input from the A/D converter 125. The DSP demodulation process ascertains the data rate of the received signals.

The demodulated digital signals are transferred as a digital data output by the DSP demodulator 126 to a control processor 127. The control processor 127 interprets network management instructions contained as part of the received data output from the DSP demodulator 126. The control processor also transfers received user messages to a display terminal 128 of typical data terminal equipment (DTE) 129. It will be understood by those skilled in the art that the display terminal 128 may be any of a number of terminal devices which translate digital code into human-discernible format, as, for example, an LCD screen 128.

The data terminal equipment 129 further includes, pursuant to the described preferred embodiment, a keyboard 130 as one of a number of devices for generating digital input messages into the communication system 100 as described herein and referred to specifically with respect to FIG. 1. Other devices for entering digital data into the system may be a laser operated code scanner, or a digital output of a global positioning sensor 131 as a device for generating position data which may be transmitted as routine data reports by the mobile terminal 120 to the LES 140 (see FIG. 1) over one of the return channels 162, 163, the latter also being shown in FIG. 1.

Based on received network management instructions, such as data transfer rates, return channel frequencies and assigned time slots, the control processor 127 of the mobile terminal 120 compiles user messages for transmission at a designated one of a number of available data rates over the designated return channel 162 or 163. Data identified as signalling data packets or user messages are transferred to a frequency synthesizer 132 from which a data modulated local oscillator signal is applied to the IF stage 124 and another unmodulated local oscillator signal is applied to the RF stage 123 to transmit the RF modulated data during the time slots reserved for the particular mobile terminal 120.

It is well a established practice to use frame periods of a sequence of frames of information transmitted over a forward channel of a TDMA communication system for determining the slot timing of the return channels. The communication system 100, as depicted in FIG. 1, also uses this practice. However, because of a reduced frame length with respect to the frame length of prior art communication systems, a typical command-response type of transaction over the described communication system 100 may be completed in less than 10 percent of the time required by prior art systems.

Message transport delays include signal propagation delays of transmissions relayed via satellite which may range between 239 and 277 msec, approximately ¼ of a second. Propagation delays will not change pursuant to the present invention. However, a decoding delay caused by a necessity of receiving a single, complete prior art frame having a length of 8.64 seconds before decoding can start is reduced to about 11 percent of the prior art delay in the preferred embodiment by a reduction of the frame length to one second. However, reducing the frame length disadvantageously affects the ratio of necessary network management information overhead contained in each frame relative to total data byte space available within the frame.

Figure 6A:
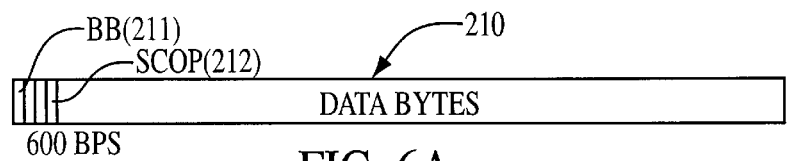
FIGS. 6a–6h show a group of vertically arranged time bars drawn in substantial temporal relationship to each other, the time bars representing a frame pursuant to the prior art in FIG. 6a, and frames of different types and their characteristic arrangement pursuant to features of the present invention in FIGS. 6b–6h.

Referring to FIGS. 6a–6h, there are shown schematic representations of frames in an approximate time relationship to each other. FIG. 6a shows a representative prior art TDM frame 210 which is 8.64 seconds in length, containing 640 bytes, using the prior art data rate standard of 600 bits per second. The frame 210 includes a bulletin board (BB) 211 with a fixed number, 14, of data bytes which occupies 0.19 seconds of the frame length. The bulletin board 211 is followed by signalling channel descriptor packets (SCDP) the number of which depends on the number of signalling channels (13 bytes per channel) in the channel group of the prior art system. Three such SCDP units 212 are depicted which use up a period of 0.53 seconds of the length of the prior art frame 210. Thus, 0.72 seconds of 8.64 seconds of the frame length are occupied by a network management information. If the length of the frame 210 were shortened while maintaining the same data rate, the network management information within the frame 210 would take up relatively a greater percentage of the frame length, leaving less available time for the transmission of user data, for example. The data transmission efficiency over the forward channel declines. But even if the data rate is increased to shorten the frame length, the overhead ratio remains constant and an increase of the data rate from 600 bps to 4800 bps allows a reduction of the frame length from 8.64 to 1.08 second while maintaining the same overhead ratio. An increase in the data rate over any given prior rate is known to increase the power requirement for transmitting the data at such higher rate, proportionally to the increase. State of the art mobile satellite systems do not favor the transmission of data at rates greater than 4800 bps in a 5–6 kHz bandwidth. Thus, any reduction in the frame length to less than one second at the rate of 4800 bps would decrease the effective user information throughput over the forward channel, owing to an increase in the percentile frame overhead devoted to network management information. FIGS. 6b through 6h maintain substantially the same horizontal time scale as that of FIG. 6a to permit a comparison with the prior art frame of the percentile overhead devoted to network management information in frames of a selected length and formatted pursuant to features of the invention. Comparative language in the further description with respect to FIGS. 6b–6h relate to the prior art depicted in FIG. 6a, unless otherwise noted.

Figure 6B:
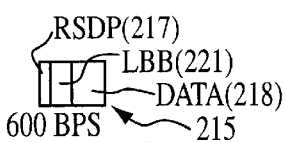

FIG. 6b is a schematic representation of a login frame 215 designated herein as a type A or first type frame. The login frame 215 has a length of 1.0 second (s) as a preferred modification of the frame length pursuant to this invention. The login frame 215 is also depicted at a data rate of 600 bps, as is the prior art frame 210. The frame 215 shows network management information packets 216, 217 at the leading end of the frame 215. Whereas the relatively short login frame 215 (to reemphasize, the comparison is to the frame 210) of 1.0 second would tend to decrease message transport delays, the login frame 215 has, without doubt, an increased percentile of overhead. However, the relatively short frame length of the login frame 215 in combination with other features of the invention keeps increases in percentile overhead to a minimum, even at the 600 bps rate. At data rates higher than 600 bps, formatting of frames pursuant to the invention, actually results in increased effective information transfer rates, hence in a decrease of percentile overhead, as it becomes apparent from the description below in reference to FIGS. 6c–6h.

The login frame 215 features a leading return channel descriptor packet (RCDP) 216 of a length of about 0.1 second or about 10 percent of the frame length, which RCDP 216 is followed by a "long bulletin board" (LBB) 217 of network management data. The remaining length of the login frame 215 is a message portion 218 which may carry call-related protocol packets as well as user messages directed to one or more of the mobile terminals 120.

For a better understanding of described features of the invention and their advantages, certain terms used herein, though they may be used by and understood by those skilled in the art of communication systems, are clarified. The login frame 215 should be understood to be a frame of formatted data. The login frame 215 provides an excellent example for explaining the meaning of certain terms used herein. The term data may be used interchangeably with the term information.

There are broadly three categories of data involved in data transfer over the system 100. A first category consists of network management information or network management data. Network management data flow from the LES 140 to the mobile terminals 120. Network management data are formatted into the frames which are transmitted over the TDM forward channel to the mobile terminals 120. Network management data pertain to the overall operation of the system and include information which advises the mobile terminals 120 of the status of the system, as needed by the mobile terminals 120 to initially log into the system. Network management data also advise of the status of in-use return channels for any type of return communication by any of the mobile terminals 120 to the LES 140.

A second category of data are "protocol data" contained in what is known as "protocol packets". Protocol data generally provide handshaking information which is required by the mobile terminals 120 or the LES 140 in conducting particular communication sessions, in distinction over the network management data which are directed to the operation of the system as a whole. In order to set up or break down a call, the protocol packets are used both in forward channel and in return channel transmissions. The protocol packets include requests and acknowledgements by the mobile terminals 120, or logical channel assignments and announcements or verifications by the LES 140 and directed toward the mobile terminals 120. In transmissions from the LES 140 toward the mobile terminals 120 over the TDM forward channel, protocol packets may be interspersed with messages in any of the frames. Transmissions of protocol packets from the mobile terminals 120 to the LES 140 occur in discretely spaced signalling slots on the return channels. Data transmissions by the mobile terminals 120 to the LES 140 when made in a signalling mode are restricted to occur only within such allocated time slots known as signalling slots.

A third category of data are message data. Message data are primarily user-generated. The transfer of user-generated messages is the essence and purpose for which the communication system 100 exists. User-generated messages flow in both directions, outbound in the forward direction from the LES 140 to the mobile terminals 120 and inbound from the mobile terminals 120 toward the LES 140. There is a subcategory of message data which are contained in data reports. Data reports are short messages which are typically automatically generated and periodically transmitted by the mobile terminals 120 to the LES 140 in a signalling transmission mode.

A significant distinction of the use of data by the communication system 100 over prior art systems is that the network management data are transmitted at different rates, based on being further classified into classes of data each having different degrees of time-criticality. Each class of data is then transmitted at its distinct rate commensurate with the respective degree of time-criticality of the data. In the preferred embodiment, network management data are classified into two classes of time-critical, or real time data, and non-time-critical, or non-real time data. The real time data and non-real time data are transmitted at different intervals, and the operation of the communication system 100 becomes more efficient as a result thereof. The two classes of network management data are appropriately labeled, respectively, as real time network control data or "R-type" network control data, and non-real time network control data or "N-type" network control data.

R-type network control data, i.e., real time network control data, are time-critical data in that they are required at a frame input rate to ensure that the instructions which the real time network control data represent will influence the operation to be controlled, namely, return channel transmissions, at the required time, namely, at already identified signalling slot periods which are timed by the frame and at the frame rate. R-type network control data allocate in this regard, pursuant to the invention, designated, subsequent return channel slots to either messaging or signalling modes, and received R-type network control data include two slot markers which relate to identified respective prior and subsequent time slots. The slot markers indicate with respect to the identified prior time slots whether signalling channel bursts of data were successfully demodulated in each of the identified slots of prior transmissions by the mobile terminal 120 (FIG. 1). The data terminal 120 receiving the R-type network control data on the TDM or forward channel 161 will examine the data (the status of the slot markers) to determine whether or not to retransmit if the respective prior transmissions were either not received or were received in error, for example through collision with another transmission on the same slot from another mobile terminal. The slot markers indicate with respect to the identified subsequent time slots whether such identified subsequent time slots are reserved or may be accessed by any mobile terminal 120 on a contention basis. R-type network control data are transmitted at a frame rate are contained as a first data packet in the RCDP 216 of each frame.

N-type network control data, i.e., non-real time network control data are non-time-critical in that such data typically change infrequently relative to the time span of a communications session, giving the non-time-critical data a quasi-static character. This does not imply, that N-type network control data are not significant to the operation of the system as a whole. Login information such as frequency listings of in-use return channels must be acquired by any one of the mobile terminals 120 before it can even attempt to log into a designated channel group. But the operation of the communication system 100 as a whole is benefitted when existing message traffic of possibly more than 1000 currently logged-in mobile terminals 120 is given priority over a mobile terminal which first seeks to log into the system. An analogy may be drawn to vehicular traffic on a high-speed traffic route with respect to which there is a requirement for any traffic seeking to enter the flow of traffic to yield to already existing traffic so as to sustain existing flow.

The login frame 215 is, pursuant to the invention, the only type of frame which includes the R-type network control data and all of the N-type network control data of the network management data, in addition to having protocol packages interspersed with user messages in the message portion 218. The relatively short frame length of the login frame 215 relative to the 8.64 second frame length of the prior art frame shown in FIG. 6a, increases the percentile overhead of network management data with respect to space which can be allocated to user messages. The term "effective information rate" refers to the rate at which message data and protocol data, but exclusive of network management data, are transmitted over the forward channel. The effective information rate, or effective data rate, is thus related to the ratio of network management data to total available data capacity of a frame.

When a mobile terminal 120 becomes logged into the communication system 100 (FIG. 1), the respective control processor 127 (FIG. 5) of the mobile terminal 120 stores the bulletin board system information and updates it only when changes are incurred during subsequent receipts of the bulletin board 217. Frequencies of in-use return channels 162, 163 (see FIG. 1) are listed as a serial table in the bulletin board 217. In-use return channel data remain essentially the same over long periods of time. The frame numbers are consecutive and change linearly with time. Thus, internal clocks (not separately shown) of the mobile terminals 120 track, and interpolate between, frame numbers transmitted periodically by the bulletin board. Available data rate combinations for the forward channel and the return channels are contained in a binary coded lookup table, which is stored in each of the mobile terminals 120. The bulletin board contains a binary code for the currently assigned data rates. Before login can occur, the bulletin board information must be acquired by the respective mobile terminal 120.

Figure 6C:
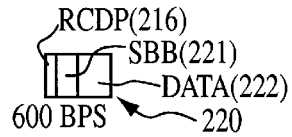

According to the preferred embodiment, there exists a short bulletin board frame 220 or frame (B), a second type of frame, which is depicted in FIG. 6c. The short bulletin board frame 220 is shown for the same data rate of 600 bps as the login frame 215 and is also 1.0 second in length. The short bulletin board frame 220 also features the distinguishing leading RCDP 216 of R-type network control data which is followed by a short bulletin board (SBB) 221. The short bulletin board is a subset of the long bulletin board (LBB) 217 in that N-type network control data which make up the short bulletin board 221 are also found in the long bulletin board 217. However, certain other information, such as a randomizing interval code, a calendar date code and the aforementioned tables of in-use return channel frequencies are omitted in the short bulletin board 221. A remaining message portion 222 of the short bulletin board frame 220 provides, consequently, more byte positions for user messages and protocol packets than the message portion 218 of the login frame 215 in FIG. 6b.

Figure 6D:
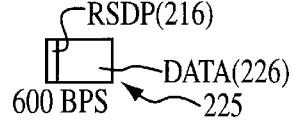

FIG. 6d shows a third type of frame (C), a message frame 225, which also has a length of 1.0 second, but does not contain any N-type network control data, neither the subset of the short bulletin board 221 nor the complete set as in the long bulletin board 217. The message frame 225 also begins with the return channel descriptor packet (RCDP) 216, which constitutes the time-critical or R-type network control data. The remainder of the frame is allocated to a message portion 226 dedicated to user messages and protocol packets to be transmitted over the TDM or forward channel 161 (FIG. 1).

Figure 6E:
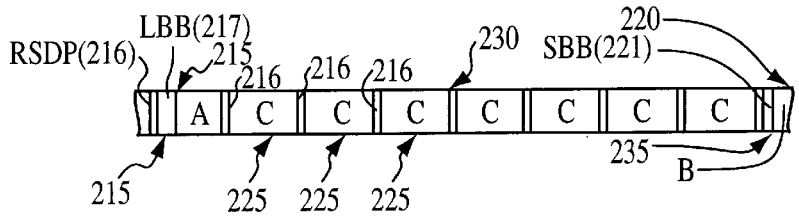

FIG. 6e is a schematic representation of a frame arrangement referred to as a superframe 230. The superframe 230 is a sequence of one first type of frame (A) or login frame 215 and seven third type of frames (C) or message frames 225, thus extending over a period of 8 seconds in length. The first frame of the superframe 230 consequently begins with the time-critical information, the R-type network control data of the RCDP 216, followed by the N-type network control data of the long bulletin board 217. Each subsequent frame of the superframe 230, is a message frame 225 and contains only the R-type network control data of the RCDP 216, allowing the remaining capacity of the frame for messages and protocol packets, hence, for message data and protocol data. It has been found that a login delay of no longer than 16 seconds occurring on 50% of attempted logins is clearly acceptable, and that a reduction in frame length does not require an association of all N-type network control data or network management information with each frame.

It is noteworthy that only 50% of a deployed number of the mobile terminals 120 will take 16 seconds to log in, the remaining 50% achieving login within 8 seconds, even when the long bulletin board 218 is only transmitted in alternate superframes 230. It is however, clear from the structure of the superframe 230, as described with respect to FIG. 6e that time-critical or R-type network control data are included in every frame. The R-type network control data are required in situations where the mobile terminal 120 must provide an immediate response. Hence, R-type network control data are transmitted at a first rate which is the frame transmission rate, while N-type network control data, as required for login of a mobile terminal 120 (FIG. 1) is broadcast periodically at a second rate which is less than the frame transmission rate at which the R-type network control data are transmitted.

FIG. 6e depicts in the first frame position following the last message frame 225 of the superframe 230 the second type of frame (B), or short bulletin board frame 220, including the short bulletin board 221 as described in reference to FIG. 6c. The short bulletin board frame 220 is followed by seven message frames 225 (of which only the first message frame 225 is shown), to form with the short bulletin board frame 220 an alternate superframe 235.

In reference to FIG. 6e, the LES 140 (in FIG. 1) arranges, consequently, in periodic repetition, one login frame 215 or first type of frame (A) and seven message frames 225, the third type of frame (C), into a sequential grouping of eight 1-second frames thereby forming in each repetition a superframe 230 of the predetermined length of eight seconds. At the same periodic repetition rate, the LES 140 arranges alternately one short bulletin board frame 220, type (B), and seven message frames 225 or third type of frame (C) into a second type of sequential grouping of frames, forming the second type of superframe 235, which also is 8 seconds in length. The LES then transmits the superframes 230 and 235 in alternate succession, each at one-half of the superframe rate. Because the short bulletin board 221 is a subset of the long bulletin board 217, it should be apparent that successive pairs of alternately recurring superframes 230 and 235 constitute a "hyperframe" whose hyperframe transmission rate is half that of the superframe transmission rate. A hyperframe always begins with a login frame 215, containing the long bulletin board 217. The superframe, in relation to a hyperframe, is a shell within the hyperframe, as any of the frames described herein are shells within the respective superframe.

In the preferred embodiment, the first type of frame 215 containing the long bulletin board 217 is transmitted as the first frame of all even numbered superframes 230 of a continuous sequence of superframes 230 or 235, and the second type of frame 220 containing the short bulletin board 221 is transmitted as the first frame of all odd numbered superframes 235 of the continuous sequence of superframes 230 and 235. Thus, login information, contained as a set only in the long bulletin board 217 (or login bulletin board 217) may be acquired by a mobile terminal at the earliest occurrence of a periodic transmission of login information which is transmitted during the transmission of a first frame 215 of even numbered superframes 230 at a rate of ½ of the superframe transmission rate, thus once during each hyperframe of a succession of superframes 230 and 235. Time-critical data are transmitted at a frame transmission rate which is a multiple of the superframe transmission rate of the superframes 230 or 235.

The foregoing suggests that variations are possible as to how, and at what frame rates, frames with time-critical information are transmitted within the structure of superframes or hyperframes, which in turn are transmitted at respectively lower transmission rates than the frame transmission rate. For example, one may refer to the described embodiment according to which alternate superframes 235 contain in a leading short bulletin board frame 220 N-type network control data which are a subset of the set of N-type network control data providing complete login information in the long bulletin board 217. As a modification thereof, it is conceivable to substitute for the short bulletin board frame 220 a message frame 225. The substitution forms a superframe which has a length of the hyperframe as described above. In such modified case, the login information is still transmitted at a rate less than the transmission rate of the frames which make up the superframes, of once every 16 frames, although the partial N-type network control data contained in the short bulletin board frame 220 will no longer be available every 8 frames. It is also possible within the scope of the invention to transmit the login frame 215 at the beginning of every superframe of a length of eight seconds. In such modified superframe structure, the maximum acquisition time for login information by a mobile terminal would be shortened from 16 seconds to 8 seconds. The latter modification, of course reduces, with respect to the preferred embodiment, the effective information rate, owing to an increase in the percentile overhead of network management data.

Other features of the preferred embodiment include the ability to transfer data over both TDM, or the forward channel 161, as well as over an assigned return channel 162 or 163 (FIG. 1) at one of a number of designated data rates. FIG. 6e depicts the superframe structure with the respective bulletin boards 217 and 221 corresponding in scale to the prior art bulletin board 21 1, as well as the RCDP 216 for three return channels corresponding in scale to the scale of the three prior art SCDPs 212, all being shown at the same data rate of 600 bps as the standard data rate over both the forward and the return channels of the prior art frame as depicted in FIG. 6a. Other contemplated forward channel data rates in accordance with the preferred embodiment are 1200, 2400 and 4800 bps, as described in reference to FIGS. 6f–6h below.

Figure 6F:
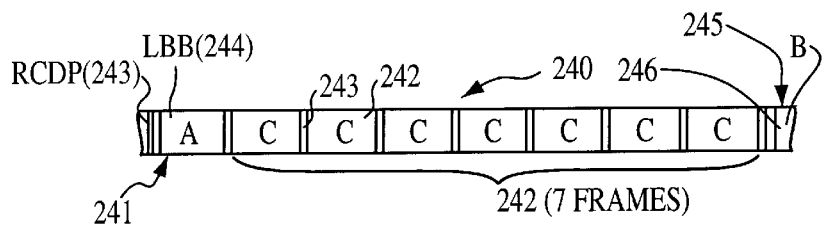

FIG. 6f shows a superframe 240 of a sequential arrangement of eight frames, a first frame being of the first type (A), a login frame 241, followed by seven message frames 242 which are of the third type of frames (C). The frames 241 and 242 in the superframe 240 are structured, respectively, like the login frame 215 and the subsequent message frames 225 of the superframe 230 depicted in FIG. 6e, except that the data rate in the superframe 240 and each of the frames therein is a 1200 bps rate. The RCDPs 243 which delimit the beginning of each of the frames 241, 242 in the superframe 240 contain the same number of information bits as the RCDPs of the respective frames 215 and 225 depicted in FIG. 6e. Also, the bulletin board information in a long bulletin board 244 of the login frame 241 is essentially the same as, and is structured in information bits identically to, the long bulletin board 217 depicted in FIG. 6e. The distinction of the frames 241 and 242 in FIG. 6f over the corresponding frames 215 and 225 in FIG. 6e is the time compression of data bytes, providing for a greater byte capacity within the same frame length of one second as that of the frames shown in FIG. 6e. The time compression at the doubled data rate reduces the forward channel overhead occupancy in each frame with respect to the total of available data bytes per frame by 50 percent.

The superframe 240 which is shown in its entire length in FIG. 6f would by definition be an even numbered superframe in a continuous succession of superframes, the even numbered superframes having in the first frame position a login frame, the login frame 241 of data at 1200 bps in this example. The even numbered superframe 240 is followed by an odd numbered superframe 245 which begins with a short buletin board frame 246, a portion of which is shown as the beginning of the next, alternate superframe at the 1200 bps rate.

Restructuring the frame by removing network management information which is not time critical, such as by removing N-type network control data from all but one frame in a superframe, as a basis for reducing data transfer delays by short frame transmissions, is seen as a departure from prior art practices. The sequencing of 1-second frames in a superframe structure of a leading frame including N-type network control data and seven message frames 225 (in FIG. 6e) and 242 (in FIG. 6f) achieves a major improvement in message transfer delays at both the 600 bps and 1200 bps data rates. A trade-off for increased transmission power at the higher 1200 bps data rate is seen to be two-fold. Doubling the data rate doubles the data transfer capacity. But also, as described above, the ratio of management network information overhead to data bytes per frame is cut in half. The latter improvement intrinsically raises the throughput efficiency of the communication system 100 (FIG. 1). By doubling the data rate, the effective information rate, which excludes the information contained in return channel descriptor packets (RCDPs), bulletin boards and any flush byte, is more than doubled.

Figure 6G:
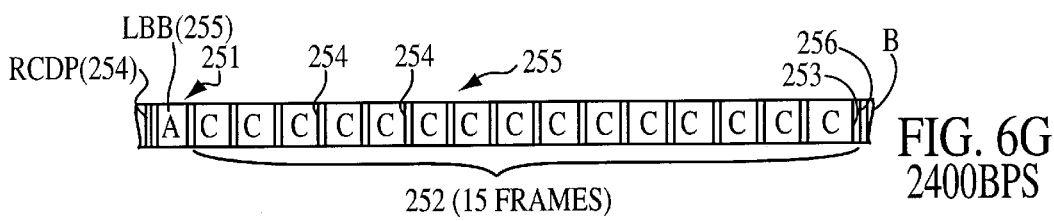
Figure 6H:
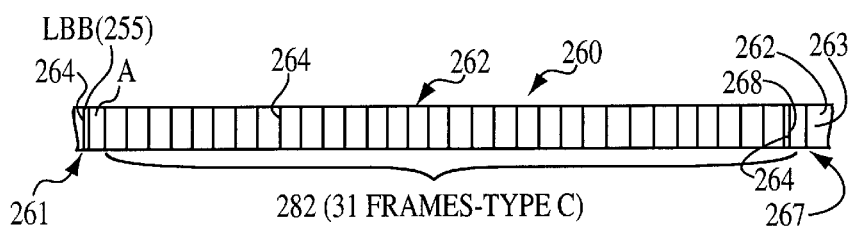

Information transmission efficiencies achieved by doubling the data rate from 600 bps to 1200 bps as described with respect to FIG. 6f are substantially retained at further data rate increases with a corresponding reduction in the frame length as shown in FIGS. 6g and 6h. Such further increased data rates maintain the ratio of overhead information to the total byte length of each of the three types of frames (the login-type or type A, the short-bulletin-board-type or type B and the message-type or type C) as that achieved by the 1200 bps data rate described in reference to FIG. 6f.

FIG. 6g schematically illustrates a superframe 250 which is composed of 16 frames of 0.5 second in length and contains information at a data rate of 2400 bps. The first frame of the superframe 250 is a login frame 251, thus of the first type or type A The first type of frame 251 at the beginning of the superframe 251 again identifies the superframe as an odd numbered superframe in a continuous stream of superframes of information transmitted over the TDM or forward channel 161 (FIG. 1). Comparing the login frame 241 in FIG. 6f with the login frame 251 in FIG. 6g, the frames both have the same number of bytes, and, given their application to the same channel group, the respective RCDP frame portions are identical in the number of bytes, as are the respective bulletin boards. The same holds true when the short bulletin board frame 243 of FIG. 6f is compared to a short bulletin board frame 253 of FIG. 6g, or when one of the message frames 242 in FIG. 6f is compared to one of the data frames 252 in FIG. 6g. In FIG. 6g, an RCDP 254 is at the beginning of each of the frames. A long bulletin board 255 in the login frame 251 is shown as being time compressed proportionally to time compression of the frame 251 relative to the login frame 241 in FIG. 6f, and the short bulletin board 256 of the short bulletin board frame 253 is similarly proportionately reduced in length. In each comparison the total number of data bytes and the ratio of network management information bytes to the total number of data bytes for each respective frame type are the same.

It should also be noted that even though the data bytes in the frames of FIG. 6g have been time-compressed with respect to those in FIG. 6f, the length of the superframe 250 has not changed with respect to the lengths of the previously described superframes 240 and 230. Thus, in contrast to the superframes 240 and 230, the structure of the superframe 250 at 2400 bps pursuant to the preferred embodiment described herein contains 16 frames, each being 0.5 s long, to maintain the same superframe length of 8 seconds.

FIG. 6h illustrates schematically data transfer over the TDM forward channel at 4800 bps. A superframe 260 at the 4800 bps data rate has preferably 32 frames, each frame being 0.25 second in length, to account for the superframe length of 8 seconds. The first frame of the superframe 260, as illustrated, is also a login frame 261, thus of the first type or type A. The login frame 261 is followed by 31 message frames 262. Pursuant to the described, preferred embodiment, login frames (type A) occupy first frame positions in alternate occurrences of superframes. Therefore, a frame occupying the first frame position following the last frame position of the superframe 260 is a short bulletin board frame 263. Each of the frames 261, 262 and 263 begin with an RCDP 264. In the login frame 261 the RCDP 264 is followed by a long bulletin board 265. In the short bulletin board frame 263, the RCDP 264 is followed by a short bulletin board 266. The frames 261, 262 and 263, as well as the RCDP 264, the long bulletin board 265 and the short bulletin board 266 have, respectively, the same number of bytes as the corresponding frames 251, 252 and 253 and the RCDP 254, the long bulletin board 255 and the short bulletin board 256 of the superframes described with respect to FIG. 6g. The difference in each frame at the 4800 bps data rate in FIG. 6h with respect to a corresponding frame at the 2400 bps data rate in FIG. 6g is that the frames at the faster data rate are proportionally compressed in time. The first type of frame 261 at the beginning of the superframe 260 again identifies the illustrated superframe as an even numbered superframe 260 in a continuous stream of superframes of information transmitted over the TDM or forward channel 161 (FIG. 1). The second type of frame 263 is correspondingly followed by a sequence of 31 message frames 262 and forms therewith an alternate, odd numbered superframe 267.

At each of the different data rates (1200 bps, 2400 bps and 4800 bps) as they apply to the illustrated superframes of FIGS. 6f, 6g and 6h, respectively, the total number of data bytes and the ratio of network management information bytes to the total number of data bytes for each respective frame type are the same. The difference between the respective frames of FIGS. 6f, 6g, and 6h at the respectively increased data rates is a time compression, in proportion to the data rate increase, of the data bytes in the frames of FIG. 6g and FIG. 6h relative to the data bytes in the frames of FIG. 6f. Significant is that for all data rates which may be available in a range of predetermined data rates the lengths of the respective superframes is at the same predetermined length and does not change, when the data transmission rate is changed. As described, the preferred length for the superframe is 8 seconds, with a variable number of frames contained in each superframe depending on the assigned data rate of transmitted information. As the number of frames in a superframe increases proportionally to the data rate increase from 8 frames to 16 and 32 frames, the ratio of N-type network control data (N-type network control data being contained only in a first frame of each superframe) to total data byte capacity decreases. Thus, as the frame length becomes shorter at respectively higher data rates, the effective information rate over the TDM forward channel increases.

Referring back to the representative communication system depicted in FIG. 1, the return channels pursuant to the invention are not predesignated as either signalling channels or message channels, as would be the case in prior art Standard-C systems. Instead, the return channels 162, 163 are generic and provide for the transmission by the mobile terminals 120 of either signalling data in signalling information packets or of user messages over any return channel (e.g., 162, 163) in a channel group 160. The return channels 162, 163 are "time division multiple access" TDMA channels which will be accessed by multiple mobile terminals 120 transmitting from widely dispersed positions of the covered area, and involving correspondingly different propagation delays from different ones of the mobile terminals 120 to the LES 140 (FIG. 1). Consequently, a slot occupancy time as observed at the LES 140 for any one of a plurality of logged in mobile terminals 120 is expected to differ with respect to that of any other.

Differences in slot occupancy times may be unmeasurably small or may be of a measurable length. The existence of position based variations in slot occupancy times for different mobile terminals is well known from operations of prior art Standard-C communication systems. The time slots on return channels are consequently discrete units, separated from adjacent time slots by "guard spaces" of a predetermined duration to guard against variations in slot occupancy times from differently positioned mobile terminals. It is common for TDMA systems to use the frame period on the forward channel to time the slots on the return channels. For example, Standard-C systems use, at 600 bps forward and return channel data rates, and with a basic return channel "transmit frame" timing period of 8.64 seconds as established by the TDM forward channel frame length, 28 time slots of 308.3 milliseconds. Standard-C systems provide for mobile terminals to transmit data packets of 263.3 seconds during each of the time slots. The remaining gaps in each of the time slots guard against data corruption by overlapping transmissions from different mobile terminals.

It is to be noted in regard to data transmissions referred to herein, that data are transmitted as convolutionally encoded channel symbols. This general observation applies to the prior art as well as to data transmission pursuant to the invention described herein. Known techniques of encoding bytes of data bits at a given data rate are applicable. It is well known in the art that pursuant to such encoding techniques, data are transmitted as "coded bits" at a symbol rate (sps) which is higher than the designated information data rate in uncoded "information data" bits per second (bps). Advantages of the described embodiment over the prior art are not lost when existing encoding schemes are applied over the length of the frames as described herein.

As will be appreciated from the following discussion, variables, which did not exist in the operation of prior art systems, are introduced when the communication system 100 is operated according to the invention. The preferred operation of the communication system 100 is not only distinguishably changed over the prior art by transmitting data over the TDM forward channel in the relatively shorter frames, but also by using frames of different length, depending on which of a number of available data rates being is employed for transmissions over the TDM forward channel 161. Moreover, return channel timing of slots will be affected by different combinations of selected forward channel data rates and selected return channel data rates. To better understand the following discussion and description of return channel transmissions in accordance herewith, reference may be made to FIGS. 7 and 8 of the drawing, and to TABLE 1, set forth below.

Though using discrete, guarded time slots for information transfer over a TDMA return channel by a number of mobile terminals 120, the return slot timing and multi slot assignments are distinct with respect to the prior art. According to the features of the invention, a range of discrete data transfer rates are provided for both the TDM or forward channel 161 as well as the return channels 162 and 163 of the channel group 160, as set forth in TABLE 1 below. As already described, a change in the data rate may be accompanied by a change in the slot timing rate, based on the frame transmission rate used over the TDM or forward channel 161.

The preferred embodiment provides for 8 combinations of forward and return channel frequencies, as set forth in TABLE 1 below. A code for one of the combinations of forward and return channel data rates transmitted in the (short and long) bulletin boards sets the data rate at which a receiving data terminal 120 will transmit data over the assigned return channel 162 or 163. The data terminal 120 uses the forward data rate information (in form of the code) in the long and short bulletin boards to read the return data rate in the selected forward/return data rate combination. The mobile terminal 120 senses the forward data rate in the DSP demodulator 426 (FIG. 5), basing an interpretation of the data rate on detected phase changes of the channel symbols. It is noteworthy that the mobile terminal 120 cannot derive the forward data rate information from a bulletin board, because it must have the forward data rate information before it can demodulate the received symbols and read the bulletin board.

For each of the combination of forward channel and return channel data rates, a particular number of return channel slots per "transmit frame" is assigned. A "transmit frame", quite like transmit frames used in the prior art, though different in length, is a timing unit transmitted over the TDM channel 161 (FIG. 1) by which return channel transmissions are synchronized. According to the preferred embodiment, which contemplates different combinations of data rates for forward and return channel communications, each transmit frame timing unit contains an assigned number of return channel slots during which data may be transmitted by a designated one of the mobile terminals 120.

Exactly how many return channel slots are preferably assigned to a transmit frame has been found to require a consideration of data rates and transmit frame lengths on the return channels. In addition, a desirability to make the preferred operation described herein compatible with presently used modulating and demodulating apparatus further made it desirable to size the data capacity of return channel slots to accept information packets which contain the same number of code symbols as the information packets of prior art systems, for example 316 (64 unique word symbols followed by 15 bytes, 252 symbols. The number of return channel slots shown for each of the combination of preferred data rates in TABLE 1 reflect these considerations.

For data reports or other protocol packets, which in the prior art traditionally have been transmitted over signalling channels and the length of which exceeded single slot allocations, multislot allocations have been made. The prior art Standard-C systems employ multislot allocations spaced by delays of 2 or 3 frames. It has been found that the relatively shorter frame length, as used by the communication system 100 relative to the prior art, no longer provides with delays of 2 or 3 frames adequate time for data processing and propagation delays in spacing multislot signalling messages. Hence, multislot allocations in the communication system 100 are spaced by delays of 4 to 6 frames in terms of the relatively shorter frames, as compared to the prior art. Multislot frame spacing, pursuant to the invention, as described with respect to the preferred embodiment for each of the different combination of assigned data rates and frame lengths, is set forth in the last column of the TABLE 1 below.

Figure 7:
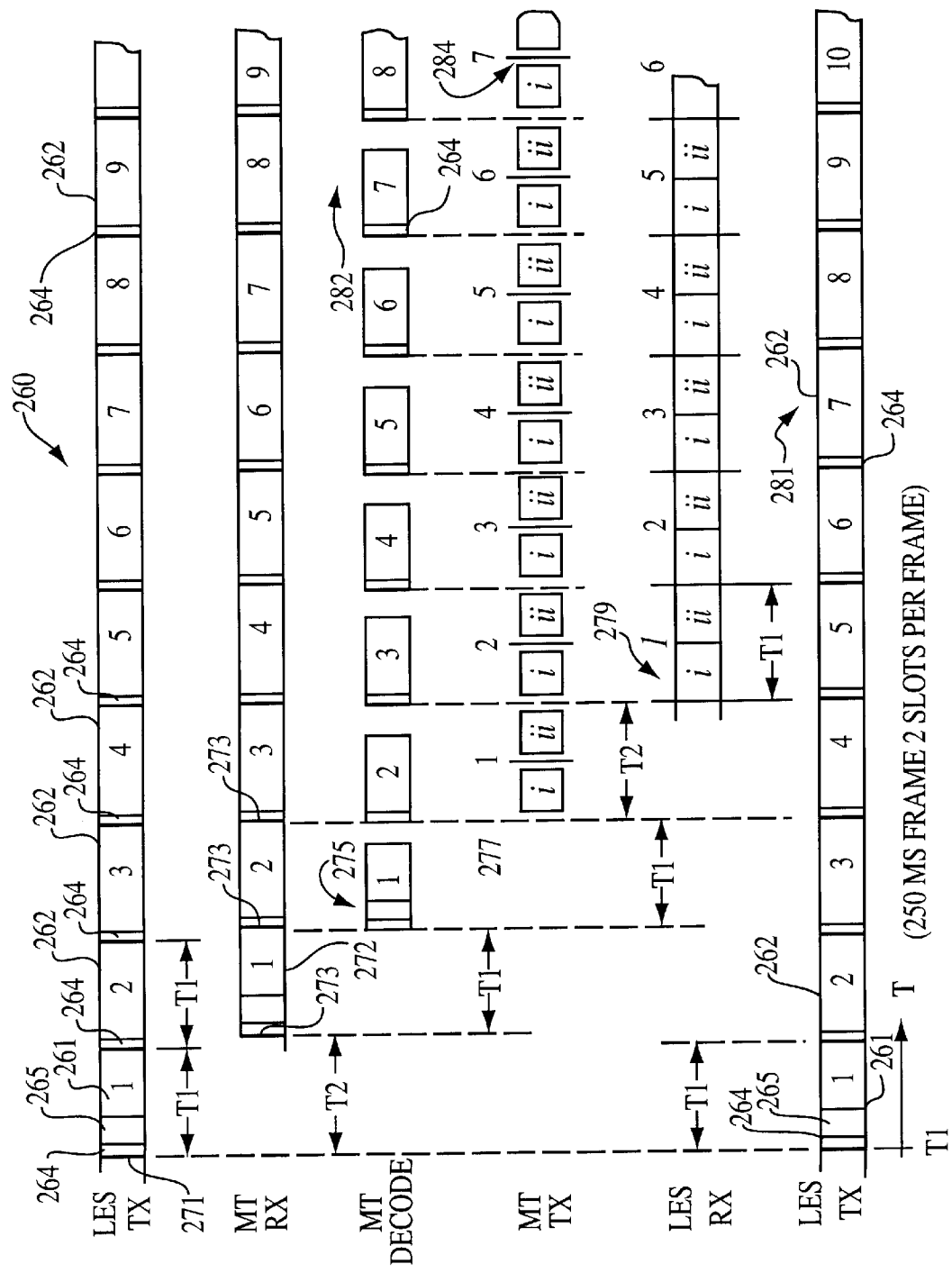
FIG. 7 is a schematic time bar diagram illustrating propagation delays and delays due to data processing requirements as they occur in the communication system of FIG. 1, and their effects on multislot operations.

FIG. 7 is a schematic time bar diagram illustrating propagation delays and delays caused by data processing requirements and their effects on multislot operations of the communication system 100 (in further reference to FIG. 1). The diagram shows time progression (t) along a horizontal axis, showing delays that need to be taken into consideration when determining minimum offsets in terms of frames for the reservation of slots in multislot transmissions of signalling data. When a transmission of a data packet by one of the mobile terminals 120 to the LES 140 in the signalling mode requires more than one slot, the same return channel slot in particular subsequently occurring transmit frame periods will be reserved, as required, to complete the transmission; provided, of course, that a first, contention-based signalling transmission is received. However, before the mobile terminal 120 can transmit any second or subsequent data packets over such reserved return channel slots, the mobile terminal 120 must first obtain feedback from the LES 120 that the first packet was indeed received and that the respective slot is indeed reserved in the expected return channel transmit frame. If this is not the case, retransmission of the first packet, on a contention basis, must be attempted. Because of propagation and processing delays, slot reservation must be spaced by an established minimum number of intervening transmit frame periods for the mobile terminal 120 to look for an acknowledgement of receipt and a reservation of the signalling slot The timing relationships shown schematically in FIG. 7 illustrate a specific example of transmit-receive delays between the LES 140 and any one of the mobile terminals 120, showing transmissions over the TDM forward channel 161 at a data rate of 4800 bps and over the return channel at a data rate of 2400 bps. Uppermost and lowermost time bars (LES TX) are identical in that both represent a transmission of a sequence of frames ("1", "2", . . . ) beginning at a reference time (t1). It is to be noted that, at the data rate of 4800 bps, FIG. 7 shows on an enlarged scale a succession of frames as described in FIG. 6h. Thus, a first transmit frame period (1) is shown as the login frame 261 having the RCDP 264 of R-type network control data, followed by the long bulletin board 265 of N-type network control data followed by bytes of messages and protocol packets. The second transmit period (2), and subsequent, consecutively numbered transmit frame periods ("2", "3", . . . ) are occupied by message frames 262, which contain no N-type network control data, so that the RCDP 264 precedes bytes of messages and protocol packets. Because of the enlarged time scale with respect to FIG. 6h, FIG. 7 shows only a beginning sequence of the 32 frames in the superframe 260, and, hence, shows only part of a superframe period.

The beginning of each (TDM) transmit frame period shows a heavy line 271 which represents transmit frame timing as it is transmitted by the LES 140 over the TDM forward channel 161. The return channel frame timing is established for the entire system by the frame timing over the forward channel, identified by the frame period "T1". At a data rate of 4800 bps, the frame period T1 is 0.25 second. A second time bar from the top (MT RX) shows, again, the sequence of frames ("1", "2", . . . ) which is offset with respect to the TDM transmit frame timing by a delay period "T2". The delay "T2" represents a propagation delay for transmissions in either direction between the LES 140 and any specified one of the mobile terminals 120. Depending on the location of the respective mobile terminal 120 the length of the propagation delay may vary, the delay "T2" being expected to vary over a range of 239–277 milliseconds (0.239–0.277 seconds). The delay period T2 is therefore expected to be somewhat greater than one frame period T1 of 0.25 s, but substantially of the same length. Thus, after the period T2, the frame "1" of information, as identified by numeral 272, is being received by the respective mobile terminal 120 at its antenna 121. Timing lines 273 represent the delayed TDM transmit frame timing at the antenna of the mobile terminal 120.

For the mobile terminal 120 to decode the received frames of information an entire frame of information has to be received, since the information was interleaved by the LES on a per frame basis and needs to be deinterleaved accordingly. A resulting decoding delay is shown in a third time bar (MT DECODE). The decoding delay has the length of one frame period T1 from the time that information is received at the mobile terminal 120. MT DECODE shows with a proper shift in time, when information transmitted as frame "1" by the LES 140, becomes available to the mobile terminal 120 as decoded data or decoded information 275. The decoded information 275 is shown to be reduced in length as it is expected that the processor time required for decoding will be less than real time. The mobile terminal 120 can transmit information in a subsequent frame timing period 277 pursuant to instructions received in frame "1" from the LES 140, as shown in time bar (MT TX). Each of the return channel transmit frame periods "1", "2", "3", . . . in the time bar (MT TX) identifies signalling slots, the mode and reservation of which would have been communicated by the LES 140 to the mobile terminal 120 in correspondingly numbered frames "1", "2", "3", . . . of the time bars (LES TX). The availability of the number of signalling slots in each transmit frame period depends on the length of the transmit frame and on the data rate of transmissions over the return channels 162 and 163. A more detailed discussion of the preferred number of slots per frame for each contemplated combination of data rates is found below.

Any signalling transmitted by the mobile terminal 120 during the period 277 corresponding to the frame period "1", is received by the LES 140 after the above-described propagation delay period of "T2" and over a frame period T1, identified by the numeral 279 in time bar (LES RX). Considering a relatively faster data processing capability at the LES 140 as compared to that of the mobile terminals 120, the earliest occurring RCDP 264 within which receipt can be acknowledged is that of the transmit frame period "7" shown at 281 in the time bar (LES TX). The decoded information transmitted by the LES 140 by TDM transmit frame "7" (at 281) is available as decoded data at the mobile terminal 120 in the corresponding decoded data packet "7" as identified in the time bar (MT DECODE) by numeral 282. The respective flags in the RCDP 264 thereof indicate whether the prior signalling transmission by the mobile terminal 120 has been received and reserve the same slot for a subsequent frame period 284 for transmission use by the mobile terminal 120. This subsequent transmit frame period at 284, also identified as frame period "7" in the time bar (MT TX), is the sixth transmit frame period of the mobile terminal 120 relative to the first frame in a multislot-packet transmission. The frame period 284 is the earliest occurring transmit frame period at the mobile terminal 120 following the first multistot frame for which the slot allocation for a second multislot frame transmission by the mobile terminal could have been confirmed, and for which multislot reservations could have been made, considering all processing times and propagation delays.

TABLE 1 below sets forth in the last column preferred multislot frame numbers for the different combinations of assigned data rates over the TDM forward channel 161 and the return channels 162 and 163 according to the preferred embodiment.

TABLE 1

| {PRIVATE} Data Rate Code | Forward Data Rate (bps) | Return Data Rate (bps) | Frame Period (s) | Slots per Frame | Multi-slot Frame No |
| --- | --- | --- | --- | --- | --- |
| 000 | 600 | 600 | 1.0 | 3 | 4 |
| 001 | 600 | 1200 | 1.0 | 6 | 4 |
| 010 | 1200 | 600 | 1.0 | 3 | 4 |
| 011 | 1200 | 1200 | 1.0 | 6 | 4 |
| 100 | 2400 | 1200 | 0.5 | 3 | 5 |
| 101 | 2400 | 2400 | 0.5 | 5 | 5 |
| 110 | 4800 | 1200 | 0.25 | 1 | 6 |
| 111 | 4800 | 2400 | 0.25 | 2 | 6 |

Referring to TABLE 1 for a specific example, when a bulletin board of a first type of specifies in designated bit positions of a status byte a three-bit data rate code of "101", all receiving mobile terminals 120 (see FIG. 1) are instructed that forward channel communication is set to be at a data rate of 2400 bps and all associated return channels 162, 163 (see FIG. 1) are operated at the return channel data rate of 2400 bps. Column 4 of the table may be read in reference to FIGS. 6g, which depicts a frame length of 0.5 second for a bit rate of 2400 bps on the forward channel. The sixth column of TABLE 1 shows the corresponding frame delay of five slots between slots in multislot packet transmission, not counting the current slot.

The fifth column in TABLE 1 specifies the number of slots which are available within a time period of one frame. In general, it will become apparent that, given a designated maximum size of a return channel signalling packet of a fixed number of symbols, the symbol length being data rate dependent, the available slots per frame depend on the length of the frame and the data rate at which the return channel signalling packet is transmitted by the mobile terminal 120. There is, however, one other consideration which enters into a determination of how many return channel slots are available per frame at any given return channel data rate, and that is a consideration that slot guard time requirements are independent of frame lengths or data rates on the return channel. Thus, as the frame lengths become shorter, even though the return channel data rate may be increased proportionally to the frame length reduction, the number of permissible slots in each frame may have to be reduced to maintain the minimum guard time.

Figure 8:
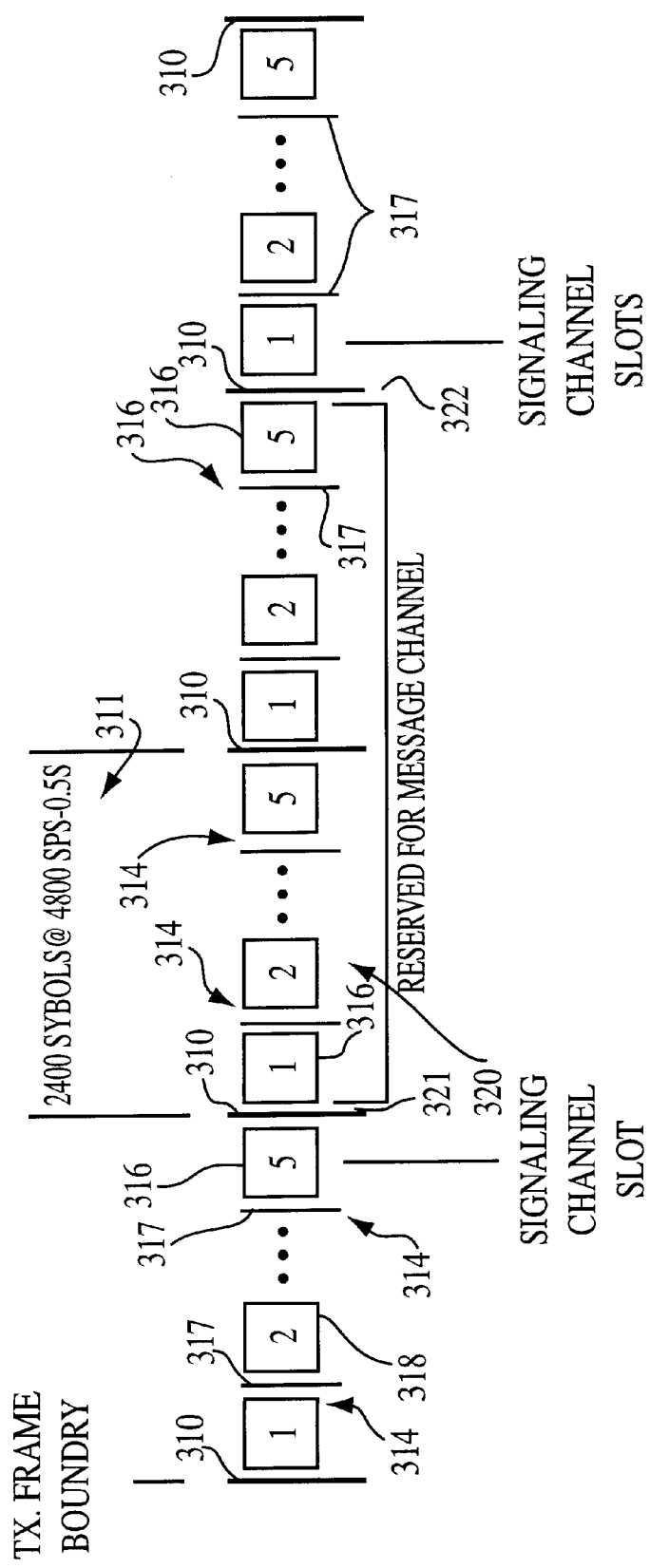
FIG. 8 is a schematic diagram of the structure of return channel communications with alternate signalling and messaging periods pursuant to a feature of the invention.

Column 5 of TABLE 1 is further explained in reference to FIG. 8 which depicts the structure of return channel communication at data rates set by the binary code of "101" in the first column of TABLE 1. The data rate for return channel communication is set by the binary code "101" at 2400 bps, and the frame length for forward channel communication at 2400 bps is 0.5 second, as shown in column 4 of TABLE 1. In column 5 of TABLE 1, there are five signalling channel slots allocated per frame for the respective data rate combination. In FIG. 8, evenly spaced markers 310 show timing signals at the mobile terminal 120 (FIG. 1) which occur at the transmit frame rate of 1/0.5=2 seconds, which is identical to the received forward frame rate. As discussed with respect to FIG. 7, the transmit frames at the mobile terminals 120 are synchronized to the forward TDM frames as received by the mobile terminals, with the described propagation delay T2. In FIG. 8, the spacing between two adjacent frame markers 310 designates a period 311 corresponding to the length of one frame of 0.5 second. At a return channel data rate of 2400 bps, there will be 1200 bits in each 0.5 second frame period, which translates into 2400 coded bits, or symbols, with a rate-½ code, per frame period, resulting in the rate of 4800 symbols per second (sps). Dividing an established return channel signal packet size of 316 symbols in length into the frame period of 2400 symbols at the given rate, and neglecting the necessity of having guard spaces 314 of adequate length, for purpose of this analysis only, then the frame period 311 of 0.5 seconds might have accommodated 7 return channel signalling slots. However, a minimum safe length for the guard spaces 314 between two adjacent signalling slots 316 of no less than 30 milliseconds, nominally, dictates that the number of return channel signalling slots 316 may not vary linearly with the return data rate or with the frame length, but that it must vary with due consideration given to guard spaces 314 of adequate length between adjacent ones of the slots 316. The guard spaces 314 discretely space each of the signalling slots 316 by a minimum time interval. The assigned return channel signalling slots per frame as set forth in TABLE 1 reflect the need for the guard spaces 314. In FIG. 8, the guard spaces 314 are located on either side of nominal slot boundary markers 317, spacing an optimal number of seven signalling slots 316 substantially evenly within each of the 0.5 second frame periods 311.

When reading the following characteristic return channel operations with respect to FIG. 8, reference may also be made to FIG. 1 with respect to referred-to system elements. FIG. 8 illustrates the generic character of the return channels 162 and 163 as signalling and message channels. Though the return channels 162 and 163 function in either messaging or signalling modes, it is preferred that a default state of any return channel is that of a signalling channel.

The significance for reverting the return channels 162 and 163 to a signalling channel state is best understood when the character of the return channels as TDMA channels is kept in mind. The use of one of the return channels 162 or 163 for message transmittal removes that channel from access by other mobile terminals 120 for the duration of the message. When one of the return channels 162 or 163 is used as a message channel, as depicted by a message block 320 in FIG. 8, the message transmission will be continuous over the period of the assigned number of signalling slots, except for a leading guard space 321 preceding the first assigned slot 316 and for a trailing guard space 322 following the last slot 316 assigned to the transfer of the message. The entire time span, starting with the leading edge of the first occupied slot and ending with the lagging edge of the last occupied slot, becomes a single, continuous message block within which slot positions as such have lost their character. It should be noted that the LES 140 allocates periods of the return channels 162 or 163 to messaging activities for the lengths of periods as requested by any of the logged in mobile terminals 120. The allocation is made by the LES 140 in the return channel descriptor packets, such as the RCDPs 216 in FIGS. 6b–6e, which appear at the beginning of each frame transmitted over the TDM or forward channel 161. The transitions from messaging to signalling or from signalling to messaging will correspondingly occur at one of the spaced markers 310 representing the frame timing signal. A messaging allocation of a return channel period to any particular one of the mobile terminals 120 is therefore made for the duration of any number of complete frame lengths, less the leading and trailing guard spaces 321 and 322 of, respectively, the first frame and the last frame allocated to the message.

Slot reservations in multislot signalling transmissions by the mobile terminals 120 reserve future return channel capacity to a signalling mode. Multislot signalling packet transmission, consequently, extends the signalling mode for the duration of the respective multislot transmission. Any other mobile terminal 120 which contends for and accesses the signalling mode of the return channel with another first packet transmission, while the return channel continues to remain in the signalling mode during the completion of the first mentioned multislot transmission, could then cause the signalling mode to be further continued based on a recurring number of spaced contentions for signalling slots of the return channel while the return channel remains in the signalling mode. Spaced, recurring multislot reservations are noted, as described above, to bring about an inherent inertia in releasing a return channel from the signalling mode to messaging activities. It is therefore preferred to cut off all multislot signalling on a particular return channel 162 or 163 on allocation of the particular return channel to a messaging activity.

The described advantageous features of the communication system 100 are contemplated to be operated over existing or new satellite links such as the satellite 155 as being representative of present and future technology. The use of such satellite links may involve the use of commercially available transmission equipment and to adapt the described features hereof to operate in conjunction with prior art equipment, such as equipment which operates in conjunction with the referred-to Standard-C communication system.

The description in FIGS. 6b–6h of TDM channel frame structures in regard to the reduction of message transport delays explained the designation of non-time-critical network management information and its inclusion in bulletin boards. Prior art Standard-C systems have the ability to interpret the bulletin board network management information at frame rate delays of 8.64 seconds. It will be understood by those skilled in the art that decoding and control apparatus, such as the DSP demodulator 126 and the control processor 127 of the mobile terminal 120, as described above with respect to FIG. 5, routinely interpret flag settings in predetermined data fields of data packets, to initiate control functions in response to such data flag indication. It will be understood that the assignment of data fields within any given network control data block is largely a matter of choice and that various modifications can be made to any preferred arrangement of data in any data block without departing from the scope of the invention. Accordingly, the detailed description of the preferred embodiment includes diagrammatic representations in FIGS. 9 and 10 of preferred arrangements of network control data within a representative long bulletin board (LBB) 217 or selectively modified short bulletin board (SBB) 221, and within a representative return channel descriptor packet (RCDP) 216, respectively.

Figure 9:
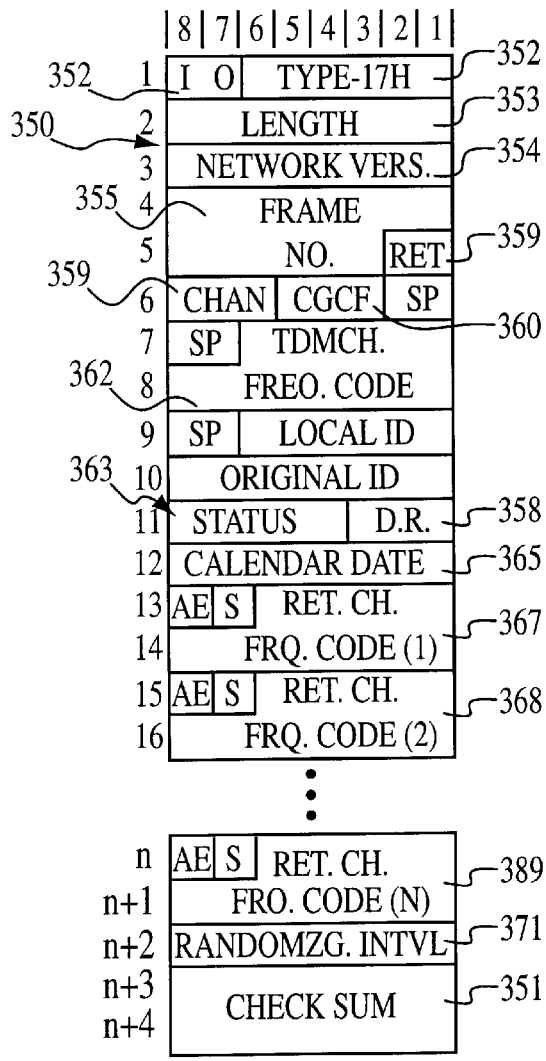
FIG. 9 is a diagram showing the structure of bulletin board of system information including system information such as return channel frequency data pursuant to features of the invention.

FIG. 9 depicts schematically a representative data structure 350 as it will be found in the above-described bulletin board 217. The data byte fields depicted in the structure 350 of data include a combination of general descriptor data as may be found in prior art Standard-C systems, combined with data which are specific to, and constitute features of, the invention. The format of data fields in the data structure 350 is consequently preferably compatible with commercial satellite links, such as AMSC-1. In FIG. 9, columns from left to right identity bit positions of data byte positions in the data structure 350, starting with bit number 8 on the left to bit number 1 on the right The first or leading byte field of the structure 350 is shown at the top of FIG. 9, while error detection check sum field 351 appears at the bottom of the block of the data structure 350. The first three byte positions of the packet structure 350 are data fields designating packet type, length and network version descriptors 352, 353 and 354. This type of information is repeated at the superframe rate and is therefore also contained in the short bulletin board 221.

A frame number field 355 in bytes 4 and 5 allocates 14 binary bit positions to a sequential frame count over a 24 hour period. The frame number field 355 also occurs in both the login bulletin board 217 and in the short bulletin board 221 (FIGS. 6b and 6c). One of the significant features of the invention requires the elimination of standard bulletin board information which is not time-critical from message frames other than those containing the short bulletin board 221 and the login bulletin board 217. The frame number field 355 is, pursuant to the preferred embodiment, included in the short bulletin board (SBB) 221 as well as in the login bulletin board 217, to provide, when updated continuously in accordance with consecutive occurrences, a count of superframes. As described in reference to FIG. 6e, the frame number field 355 in the short bulletin board 221 would show an odd-numbered count identifying an odd numbered superframe 235, while the login bulletin board 217 would show an even-numbered count identifying an even-numbered superframe 230. As described above, it is left up to the mobile terminals to determine the actual frame count of frames received over the TDM channel. Such determination would be based on a linear time interpolation from the most recent receipt of either a login frame or a short bulletin board frame, the data rate on the TDM channel, which is related to the frame length and its rate, and the count received from the respective most recent bulletin board or short bulletin board at the superframe rate. The three bit data rate code for both the forward and return channels is given in a data rate field 358 of bits 3,2 and 1 of the 11th byte position of the structure 350.

Bridging the 5th and 6th bytes is a 5-bit field which represents an active return channel count designator 359, followed by a 3-bit field representing a channel group congestion factor (CGCF) 360. The CGCF is a quantified loading or congestion indicator for the respective channel group. The CGCF 360 categorizes a current transmission congestion of the channel group involving both forward and return channels as falling into one of eight loading or congestion categories.

A 14-bit field 362 in byte positions 7 and 8 provides a frequency code of the absolute frequency of the TDM or forward channel. Other bit positions of the structure 350, up to the already identified data rate field 358, which are not specifically identified hereby, are left open to indicate either vacant or spare data fields, or to indicate that they may contain system status data which may be used in future enhancements of the present system.

In the structure 350, the data byte fields between, and exclusive of, the data rate field (D.R.) 358 and the check sum field 351 are specific to the structure 350 of the long bulletin board 217 and do not form part of the short bulletin board 221. The short bulletin board 221 consequently contains a subset of the long bulletin board or login bulletin board 217, the subset starting with field 352 and ending with the field 358, except for the check sum field 351 which is also included in the short bulletin board. Thus, in the short bulletin board 221, the check sum field 351 follows the status and data rate fields 363 and 358.

The data field 365 in byte position 12 provides a current calendar date code to the mobile terminals. It is readily seen that an 8-bit code allocation is insufficient to transmit a complete calendar date description. However, since the calendar date is not critical data transmission, the complete date code is transmitted as a set of three distinct data subsets and spans a period of three consecutive occurrences of the login bulletin board 217 in a continuous stream of transmitted frames. A first subset of data (0, 7 bits) occurring in the field 365 encodes the year of the century (0–99) as a binary number. The second data subset (1, 0, 6 bits) encodes the month of the year (1–12) as a binary number. The third data subset (1, 1, 6 bits) encodes in the field 365 the day of the month as a binary number. The complete calendar date is therefore repeated over a period of 48 seconds. The daily date subset changes, of course, at a rate of 24 hours. The first daily date subset is transmitted in the login bulletin board 217 of superframe number six in each 24-hour count and for the last time in superframe number 10800 of such 24-hour count Following the calendar date field 365, the structure 350 contains, in 2-byte sets, a sequence of return channel frequency fields 367, 368 . . . 369, the fields constituting a serial table of frequencies of in-use return channels (channel (1), channel(2) . . . channel(N)) of any one channel group. A randomizing interval designator field 371 follows in byte position (n+2) the return channel frequency fields. The randomizing interval designator field 371 is followed by the check sum field 351 in bytes (n+3, n+4) at the end of the structure 350.

From the above it will be understood that the length of the structure 350 as it applies to the login bulletin board 217 is variable, depending on how many of the return channel frequency fields are required, in other words, depending on how many return channels are active or in use in the channel group. As the number of in-use return channels increases, the serial table of listed frequencies in the bulletin board 217 becomes similarly longer. The communication system 100 in FIG. 1 shows for the forward or TDM channel 161 of the channel group 160 a total of only two active or in-use return channels 162 and 163, that is, "n" is equal to 2. Thus, for the depicted system 100 in FIG. 1, login bulletin board 217 has, pursuant to the described features, a length of 19 data bytes. The 19 data bytes are the described fixed 13 data bytes (1 through 11 and 2 check sum bytes) of the short bulletin board 221, to which are added the bytes of the randomizing interval designator field 371 plus two 2-byte return channel frequency fields 367 and 368, each of the latter designating the frequency of a respective one of the return channels 162 and 163. In light of the foregoing description it should be readily apparent to those skilled in the art that if, in the communication system 100 of FIG. 1, one of the two return channels, for example the return channel 163, were to become deactivated, the packet length of the login bulletin board 217 would change from 19 byte positions to a length of 17 byte positions. Thus in reference to FIG. 1, the return channel 162 would remain as a sole in-use return channel operating in conjunction with the TDM or forward channel 161. Consequently, the bulletin board packet 350 would include only one active return channel field 367 to list the frequency code for the return channel 162.

The above illustrates that, as the number of in-use or active return channels of any particular channel group varies based on the message volume carried by the particular channel group 160, so will the length of the login bulletin board 217. In a currently preferred operational mode of the communication system 100, network operators may add to or delete from currently in-use return channels of the respective channel group. In contrast to the login bulletin board 217, the short bulletin board 221 (FIG. 6c) which does not carry the return channel frequency descriptor bytes maintains a constant length of 13 bytes independently of the number of return channels in the channel group, pursuant to the described embodiment.

Figure 10:
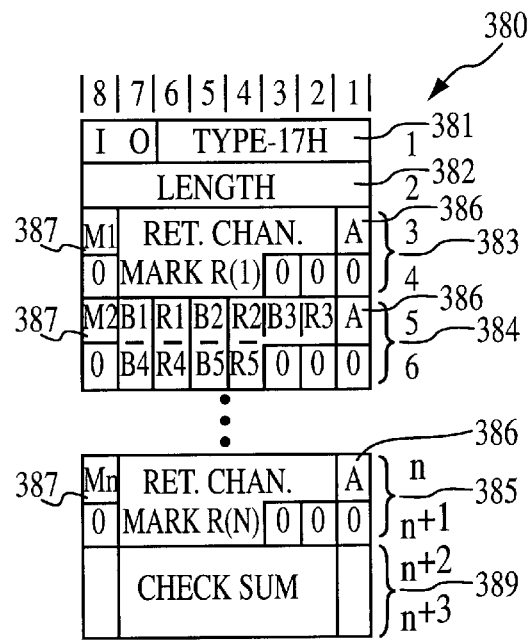
FIG. 10 is a diagram of a return channel descriptor packet structure in accordance with the invention.

FIG. 10 depicts a data structure 380 representative of data byte positions in the return channel descriptor packets (RCDP) 216, which have already been described with respect to FIGS. 6b–6h. From the above description it should be apparent, that the RCDP 216 describes the status of each of the return channel slots of the transmit frame of the mobile terminal 120 (FIG. 1) corresponding to the receive frame containing the particular RCODP, as described above in reference to FIG. 7. A single RCDP describes the slot allocations of all in-use return channels of a particular channel group. As the number of in-use return channels of a channel group varies, based on traffic conditions in such channel group, so varies the length of the RCDP. Data in the single RCDP take the place of separate signalling channel descriptor packets which are added to each TDM frame for each active signalling channel of a channel group, according to prior art requirements.

In reference to FIG. 10, the data structure 380 provides for a packet type field 381 and a packet length field 382 in byte positions 1 and 2, respectively, followed by as many return channel slot marker fields as there are active or in-use return channels in the respective channel group. FIG. 10 shows a series of first, second and an nth return channel marker fields 383, 384 and 385, showing the first return channel marker field 383 (RET CHAN MARK(1)) as providing return channel marker information for a first return channel (such as return channel 162 of the channel group 160 in FIG. 1). The second return channel marker field 384 identifies individual bit information positions for a second return channel of a respective return channel group. It should be noted that in any particular RCDP structure, such as the RCDP structure 380, all return channel marker fields of such structure, such as the fields 383, 384 through the nth, a final marker field 385 contain the same identical number and arrangement of marker bit postions as any other return channel marker field in such RCDP structure. It is further significant, that the number and order of return marker fields in any RCDP structure correspond to the number and order of the return channel frequency code fields of the corresponding login bulletin board structure 350.

The return channel marker fields carry in the 1st bit position of the leading byte position a slot preemption bit 386 "A", and in the 8th bit position of the leading byte position a message mode reservation bit, known as MMR bit 387. The MMR bit 387 has a significant function as a signalling-messaging mode flag or switch for each respective, in-use return channel 1, 2, . . . n. The MMR bit 387 is identified in FIG. 10 by "M1", "M2", . . . "Mn" for, respectively, the 1st, 2nd and nth in-use return channels. When, according to the preferred embodiment, the MMR bit 387 for any of the in-use return channels is set to "1" the respective return channel will be in the messaging mode for the duration of the respective frame period. When the MMR bit 387 is, conversely, set to "0", the respective in-use return channel will be in the signalling mode for the duration of the respective frame period. As described with respect to TABLE 1 above, the specified combination of data rates therein for (see also FIG. 1) the forward channel 161 and any of the in-use return channels will determine the number of signalling slots which are available during a transmit frame. By setting the signalling-messaging flag (the MMR bit) 387 to "1" or "0" for any selected frame or succession of frames, the respective return channel is selected for transmissions of messaging or signalling information. This is a significant feature of the present invention, in that a pair of channels of a forward channel and a return channel can comprise a fully functional channel group, whereas in the prior art systems, such as a Standard-C system, at least one signalling return channel and one message return channel was required, in addition to one forward channel, to constitute a full-function channel group. Thus, in a Standard-C system, at least three channels are required to achieve full service functionality, whereas according to the present invention, two channels are sufficient for the same functionality.

In further reference to FIG. 10, in the first byte position of the return channel marker field, six bit positions may be allocated to slot marker bits. The MMR bit 387 sets the return channel mode for the entire duration of a frame with which the respective RCDP is associated as either a messaging or signalling mode. When a logical "0" occupies the MMR bit position, the entire frame will be in a signalling mode. Correspondingly, a logical "1" state in the MMR bit position establishes a messaging mode for the entire frame length as already described with respect to FIG. 8.

The MMR bit 387 is followed by two slot marker bit positions for each slot in the corresponding frame period of the respective return channel. The logical state of the first slot marker bit indicates whether the previous slot of a particular multislot packet sequence was correctly received by the LES 140 (FIG. 1). The second slot marker bit indicates whether the particular slot is reserved. However, as described above with respect to TABLE 1 and FIG. 8, the number of signalling slots in any return channel frame period depends on the data rate combination of the forward and return channels. Consequently, the number of slot marker bit positions and consequently the field lengths of the return channel marker fields 383, 384 and 385 are data rate dependent. For each of the data rate combinations in bps of the forward channel data rate to the return channel data rate (600/600, 1200/600, 2400/1200) there are three slots per frame and, therefore, six slot marker bits are required, restricting the slot marker field to one byte. Similarly, for the forward/return channel data rate combinations of 4800/1200 bps and 4800/2400 bps, there are, respectively 1 and 2 slot positions per frame, requiring also only a single byte for the slot marker field, leaving some bit positions unused.

Forward/return channel data rate combinations of 600/1200 bps and 1200/1200 bps have six slot positions per frame and require twelve (2 per slot) slot marker bits, which are arranged in the 7-bit through 2-bit positions of a 2-byte long return channel marker field. A forward/return data rate combination of 2400/2400 bps has five slots per frame and requires ten slot marker bits with preferably 6 slot marker bits for slots 1–3 taking up the available bit positions of the first byte of a two-byte return channel marker field, while the remaining four slot marker bits preferably take up the 7-bit through 4-bit positions of the second byte of the two-byte return channel marker field. Referring to FIG. 10, the slot marker allocation shown in the return channel marker field 384 is one corresponding to a forward/return channel data rate designation of 2400/2400 bps. With brief reference to FIG. 9, such data rate combination would have been specified for the respective superframe by either the bulletin board or short bulletin board in a first frame thereof by the 3-bit code in the data rate field 358. For the illustrated 2400/2400 bps combination, the 3-bit code designation is "101", as shown in TABLE 1.

A 2-byte field 389 is a check sum field used in error detection routines during the processing of the information within the packet structure 380.

Having described the distinguishing features of both the TDM forward channel operation and of the return channel operation with respect to the preferred embodiment of communication system 100, certain changes and modifications within the scope and spirit of the invention are possible. Advantages derived through classification of network management data according to time-criticality, or more generally, according to their significance in the time domain, and a transmission of such data at different transmission rates consistent with such classification has been explained with respect to the described embodiment. Three transmission rates of (a) R-type network control data at the frame transmission rate, N-type network control data, other than a complete set of login data, at a superframe transmission rate, and N-type network control data comprising the complete set of login information (inclusive of a serial table of return channel frequency codes 367, 368 . . . 369) at ½of the superframe transmission rate (a hyperframe transmission rate) have been described above. It would be understood that changes can be made, for example, in each of the transmission rates or even in the number of transmission rate classes.

Figure 11:
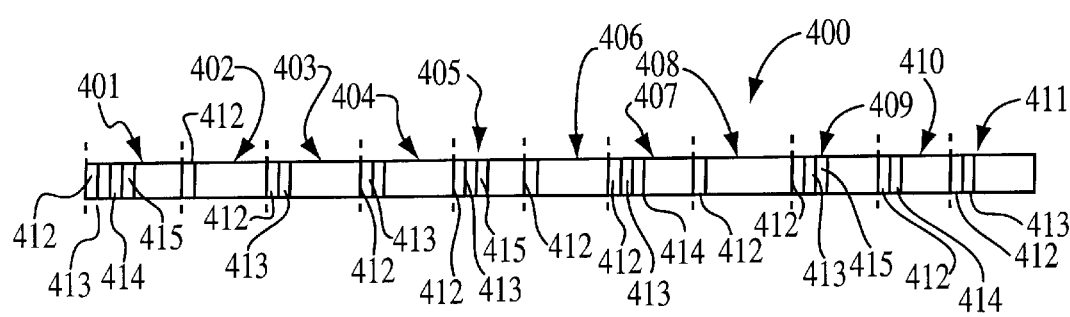
FIG. 11 is a schematic illustration of different classes of data being transmitted at different rates.

Classifying data, such as network management data, into a plurality of groups of data according to different degrees of time-related significance, referred to herein as time-criticality, and transmitting such data at different rates according to the grouping is best described in reference to FIG. 11. In FIG. 11, there is shown a representative sequence 400 of transmission repetition units or timing units of which eleven such transmission repetition units or timing units are shown, which are sequentially labelled by the numerals 401 through 411. The first transmission repetition unit or the first timing unit 401 is chosen to contain four distinct data packets, containing data of, respectively, four different degrees of time-criticality. The data packets are labelled, respectively 412, 413, 414 and 415, according to the degree of time-criticality of data contained therein. The first data packet 412 contains data which have the highest degree of time-criticality. The fourth data packet 415 contains data which have, relatively to the other three data packets, the lowest degree of time-criticality. The second and third data packets 413 and 414 contain, respectively, data of a second and third order of time-criticality.

In accordance with the time-criticality assigned to the data in the respective data packets 412, 413, 414 and 415, different rates are correspondingly assigned for transmitting the data. The data packet 412 is transmitted periodically in every timing unit 401,402,403 . . . . The data packet 413 is transmitted periodically in every second timing unit 401, 403, 405 . . . . The data packet 414 is correspondingly transmitted periodically in every third timing unit 401, 404, 407 . . . . The data packet 415 is transmitted periodically in every fourth timing unit 401, 405, 409 . . . . Thus, the network management data are transmitted periodically at a transmission rate which directly relates to the degree of time-criticality of the respective network management data. Network management data of a higher degree of time-criticality relative to other network management data of a relatively lower degree of time-criticality are transmitted relatively more frequently or in periodic transmissions having, relatively such other network management data a shorter period of recurring transmissions.

It is readily seen that the general example described with respect to FIG. 11 is similar to the more specific example of transmissions of R-type and N-type network control data over the TDM forward channel 161 (FIG. 1) of the communication system 100. The specific example of the R-type and N-type network control data includes the described, particular classification as a further feature to distinguish over the more general example in FIG. 11. In the preferred operation over the TDM forward channel 161, the disclosed hierarchy of a frame and superframe, or even a frame, superframe and a hyperframe are seen as teaching, more generally, a definition of any number of levels of time-criticality of information, such as network management information, and a corresponding number of transmission periods for each of the defined levels. From the foregoing it will be understood, changes and modifications may be made not only in the number of classes into which data can be placed as a basis for transmission at different rates, but also in the relative rates at which the different classes of data are transmitted.

Other changes and modifications may be made to the described embodiment without departing from the scope and spirit of the invention. The appended claims are intended to cover any and all such changes and modifications within the scope and spirit of the invention.

What is claimed:

1. In a communication system for communicating on at least one channel group, the at least one channel group having at least one forward channel and at least one return channel, wherein a central station transmits data over said at least one forward channel of the at least one channel group to a plurality of terminals at a forward data rate, and transmissions by any of the plurality of terminals to the central station are performed on any one of the at least one return channel of the at least one channel group at a return data rate, a demodulator comprising:

a burst demodulator demodulating received, discrete signaling packets of information; and a message demodulator responsively connectable to said burst demodulator, wherein when said message demodulator is activated, said burst demodulator becomes deactivated when the at least one return channel operates in a messaging mode.

2. A demodulator according to claim 1, wherein a network management system controls via a switch operation of said demodulator as either said burst demodulator or said message demodulator.

3. A demodulator according to claim 1, wherein said burst demodulator and said message demodulator are substantially integral with said demodulator.

4. A demodulator according to claim 1, wherein said burst demodulator and said message demodulator are physically separate from each other.

5. A demodulator according to claim 1, wherein said burst demodulator demodulates received, discrete signaling packets of information over the at least one of the return channels.

6. A demodulator according to claim 1, wherein the signaling packets of information contain message transport delays that are represented by frame periods having predetermined frame lengths in approximate time relationship to each other such that a reduction in the frame length does not adversely affect a ratio of network management information contained in each frame relative to total data byte space available within said frame.

7. A communication system for communicating on at least one channel group, the at least one channel group having at least one forward channel and at least one return channel, wherein a central station transmits data over said at least one forward channel of the at least one channel group to a plurality of terminals at a forward data rate, and transmissions by any of the plurality of terminals to the central station are performed on any one of the at least one return channel of the at least one channel group at a return data rate, said communication system includes a demodulator means comprising:

a burst demodulator means for demodulating received, discrete signaling packets of information transmitted over said communication system;

a message demodulator means for demodulating a message mode transmission received over said communication system.

8. The demodulator means according to claim 7, further comprising a network management subsystem means for controlling a switching operation of at least one of either the burst demodulator means or the message demodulator means.

9. The demodulator means according to claim 8, wherein the network management subsystem means further controls simultaneous activation and deactivation of said message demodulator means and said burst demodulator means, respectively, when at least one return channel operates in a messaging mode.

10. The demodulator means according to claim 7, wherein said burst demodulator means further demodulates received, discrete signaling packets of information transmitted over at least one of the return channels.

11. The demodulator means according to claim 7, wherein said message demodulator means further demodulates a message mode transmission received from one of the plurality of terminals.

12. The demodulator means according to claim 7, wherein operation of said burst demodulator means and said message demodulator means occurs substantially unimpaired when said burst demodulator means is physically separate from said message demodulator means.

13. The demodulator means according to claim 7, wherein operation of said burst demodulator means and said message demodulator means occurs substantially unimpaired when said burst demodulator means and said message demodulator means are substantially integral with said demodulator means.

* * * * *